US012798901B2

(12) United States Patent
Rogers

(10) Patent No.: US 12,798,901 B2
(45) Date of Patent: Nov. 17, 2026

(54) APPARATUS AND METHOD FOR OPTIMIZING SWAP TIME

(71) Applicants: KABUSHIKI KAISHA YASKAWA DENKI, Kitakyushu (JP); Yaskawa America, Inc., Waukegan, IL (US)

(72) Inventor: John Charles Rogers, Danville, CA (US)

(73) Assignees: 'KABUSHIKI KAISHA YASKAWA DENKI, Kitakyushu (JP); Yaskawa America, Inc., Waukegan, IL (US)

( * ) Notice: Subject to any disclaimer, the term of this patent is extended or adjusted under 35 U.S.C. 154(b) by 192 days.

(21) Appl. No.: 18/755,638

(22) Filed: Jun. 26, 2024

(65) Prior Publication Data

US 2025/0002268 A1 Jan. 2, 2025

Related U.S. Application Data

(60) Provisional application No. 63/523,942, filed on Jun. 29, 2023.

(51) Int. Cl.
*B65G 47/90* (2006.01)

(52) U.S. Cl.
CPC .................................. *B65G 47/907* (2013.01)

(58) Field of Classification Search
CPC .................................................... B65G 47/907
See application file for complete search history.

(56) References Cited

U.S. PATENT DOCUMENTS 9,446,910 B2 * 9/2016 Kimura .................... B25J 9/042
10,580,681 B2 3/2020 Rogers
10,780,586 B2 * 9/2020 Kitahara .............. B25J 11/0095
12,275,601 B2 * 4/2025 Osaka .................... B65G 47/90
2005/0079042 A1 * 4/2005 Maeda ..................... B25J 9/101
414/744.2
2009/0095111 A1 * 4/2009 Kitahara .................. B25J 18/04
414/787
2013/0149076 A1 6/2013 Cox et al.
2014/0234057 A1 8/2014 Newman
(Continued)

OTHER PUBLICATIONS

International Search Report for corresponding International Application No. PCT/US 24/35678, Oct. 16, 2024.
(Continued)

*Primary Examiner* — Saul Rodriguez
*Assistant Examiner* — Brendan P Tighe
(74) *Attorney, Agent, or Firm* — MORI & WARD, LLP

(57) ABSTRACT

A robotic apparatus including an arm member configured to pivot about a first axis, a first end effector, a second end effector, a drive unit, and a control unit. The first and second end effectors are pivotably connected to the arm member about a second axis, and each have a surface to receive a workpiece. The drive unit drives the arm member to pivot about the first axis, and to drive the first and second end effectors to pivot about the second axis. The control unit controls the drive unit to move the arm member and the first and second end effectors to perform a swapping operation that includes the first and second end effectors swapping arc positions at opposite ends of an arc of constant radius of curvature such that the workpieces on the first and second end effectors each travel at equal and constant velocities along the arc.

23 Claims, 21 Drawing Sheets

(56) References Cited

U.S. PATENT DOCUMENTS

| | | | | |
|---|---|---|---|---|
| 2018/0012789 | A1* | 1/2018 | Handa | B25J 15/0616 |
| 2019/0375105 | A1* | 12/2019 | Weaver | B25J 9/043 |
| 2020/0384657 | A1 | 12/2020 | Hosek et al. | |
| 2021/0057251 | A1* | 2/2021 | Matsuoka | H10P 72/3302 |
| 2021/0407837 | A1* | 12/2021 | Hudgens | H10P 72/3302 |

OTHER PUBLICATIONS

Written Opinion for corresponding International Application No. PCT/US 24/35678, Oct. 16, 2024.

* cited by examiner

APPARATUS AND METHOD FOR OPTIMIZING SWAP TIME

CROSS-REFERENCE TO RELATED APPLICATION

The present application is a non-provisional application that claims priority to U.S. Provisional Application No. 63/523,942, filed on Jun. 29, 2023, the entire contents of which are herein incorporated by reference.

BACKGROUND OF THE INVENTION

Field of the Invention

The present invention relates to a robotic apparatus, robotic handling system, and method for transporting a workpiece between various positions.

Discussion of the Background

Automated transfer devices significantly improve the efficiency, speed, and reliability at which workpieces such as semiconductor wafers are processed. Automation is particularly useful in clean room environments. When robots are used for wafer transferring should quickly and precisely transfer a wafer between various locations to reduce manufacturing time and ensure sufficient yield.

A need exists for devices that can increase the yield of a manufacturing operation, thereby reducing cost and increasing output over time.

SUMMARY OF THE INVENTION

The present disclosure advantageously describes a robotic apparatus comprising an arm member, a first end effector, a second end effector, at least one drive unit, and a control unit. The arm member is configured to pivot about a first axis. The first end effector is pivotably connected to the arm member about a second axis, and the first end effector has a first surface upon which a first workpiece can be received. The second end effector is pivotably connected to the arm member about the second axis, and the second end effector has a second surface upon which a second workpiece can be received. The at least one drive unit is configured to drive the arm member to pivot about the first axis. The at least one drive unit is configured to drive the first end effector to pivot about the second axis, and to drive the second end effector to pivot about the second axis. The control unit is configured to control the at least one drive unit to move the arm member, the first end effector and the second end effector to perform a swapping operation that includes the first end effector and the second end effector swapping arc positions disposed at opposite ends of an arc having a constant radius of curvature. The control unit is configured to control the at least one drive unit to move the arm member, the first end effector and the second end effector such that the first workpiece received on the first end effector and the second workpiece received on the second end effector each travel at equal and constant velocities along the arc.

The present disclosure advantageously describes a method of transporting workpieces with a robotic apparatus, comprising: providing a robotic apparatus having: an arm member configured to pivot about a first axis; a first end effector pivotably connected to the arm member about a second axis, the first end effector having a first surface upon which a first workpiece can be received; a second end effector pivotably connected to the arm member about the second axis, the second end effector having a second surface upon which a second workpiece can be received; at least one drive unit configured to drive the arm member to pivot about the first axis, the at least one drive unit being configured to drive the first end effector to pivot about the second axis, the at least one drive unit being configured to drive the second end effector to pivot about the second axis; and a control unit configured to control the at least one drive unit to move the arm member, the first end effector and the second end effector. The method further comprises controlling the at least one drive unit to move the arm member, the first end effector and the second end effector to perform a swapping operation that includes the first end effector and the second end effector swapping arc positions disposed at opposite ends of an arc having a constant radius of curvature, wherein the at least one drive unit is controlled to move the arm member, the first end effector and the second end effector such that the first workpiece received on the first end effector and the second workpiece received on the second end effector each travel at equal and constant velocities along the arc.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1A:
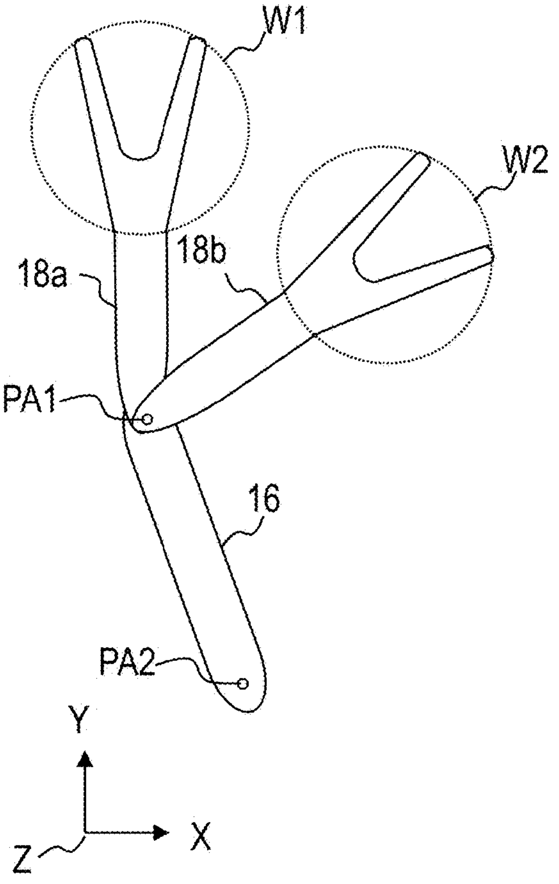
FIGS. 1A-1H are plan views of arms that can be employed with a robot according to exemplary embodiments of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

Dual blade robots can be used to perform a wafer swap from a processing stage of a processing chamber or other location at which a wafer is placed and retrieved. U.S. application Ser. No. 15/644,828, which issued as U.S. Pat. No. 10,580,681 discloses a robotic apparatus and method for transport of a workpiece that provides background teaching of an apparatus and method that the present invention can be utilized in conjunction with, and therefore the disclosure in U.S. application Ser. No. 15/644,828 is hereby incorporated herein and included herewith. For example, the robot and the control unit illustrated in FIG. 1 of U.S. application Ser. No. 15/644,828 in conjunction with the robot arm shown, for example, in FIG. 4f thereof and/or the robot arms shown in FIGS. 1A-H of the present application, can be utilized in conjunction with the present invention. Additionally, the control unit and drive units illustrated in FIG. 2 of U.S. application Ser. No. 15/644,828 can be utilized in conjunction with the present invention.

FIGS. 1A-1H depict a series of exemplary dual blade robot configurations according to embodiments of the present invention.

FIG. 1A depicts a dual blade robot having a first arm 16 and two second arms (also referred to as blades or end effectors) 18*a*, 18*b*. The blades 18*a*, 18*b* are each pivotally coupled to the first arm 16 about pivot axis (also referred to herein as a second axis) PA1, also referred to as a wrist of the dual blade robot, and the first arm 16 is pivotally coupled at a fixed location about pivot axis (also referred to herein as a first axis) PA2. The blades 18*a*, 18*b* can each hold or receive a wafer, for example, blade 18*a* holds or receives wafer W1 and blade 18*b* holds or receives wafer W2. For example, blade 18*a* could be retrieving wafer W1 from a supply/output station/chamber for delivery to a processing station/chamber (process position), and, at the same time (i.e., simultaneously or at least partially in an overlapping manner), blade 18*b* could be retrieving wafer W2 from the processing station for delivery to the supply/output station, thus performing a wafer swapping operation.

Figure 1B:
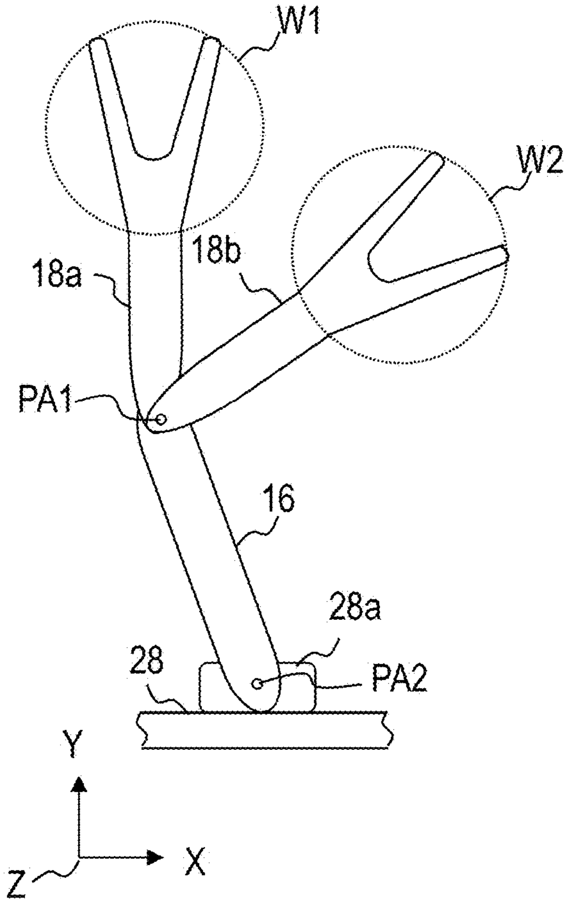

FIG. 1B depicts a dual blade robot similar to the dual blade robot in FIG. 1A; however, in the embodiment of FIG. 1B, the dual blade robot includes a track 28 for translational motion of the dual arm robot along the track 28. The track 28 can be linear or curved. In the embodiment of FIG. 1B, the first arm 16 is pivotally coupled to a translating member 28*a* about pivot axis PA2, and the translating member 28*a* is movable along the track 28.

Figure 1C:
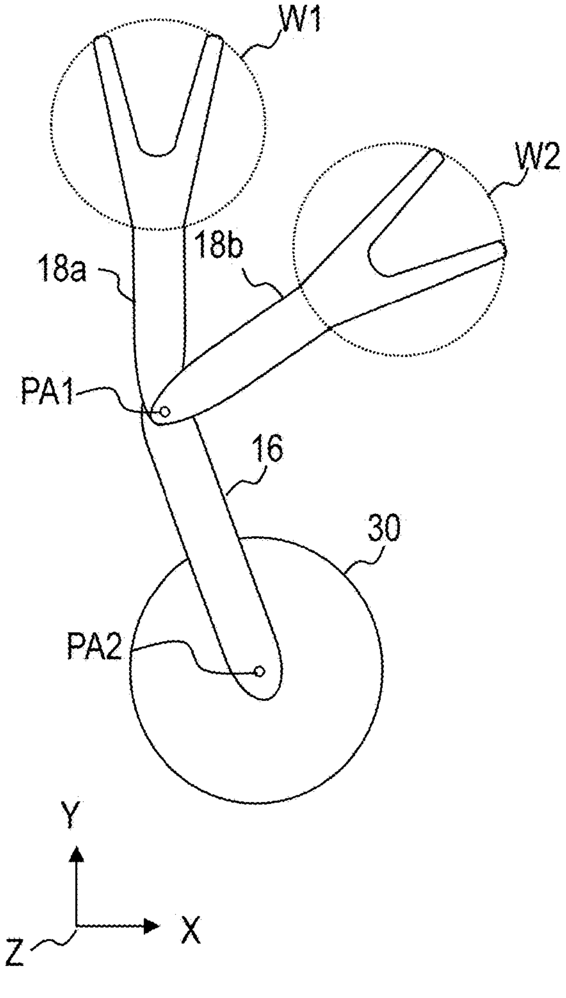

FIG. 1C depicts a dual blade robot similar to the dual blade robot in FIG. 1A; however, in the embodiment of FIG. 1C, the dual blade robot includes a base 30 for rotational motion about a Z axis (independent of or in combination with the rotational motion of the first arm 16 at axis PA2) coinciding with axis PA2 and/or Z-axis translational motion of the dual arm robot along axis PA2.

Figure 1D:
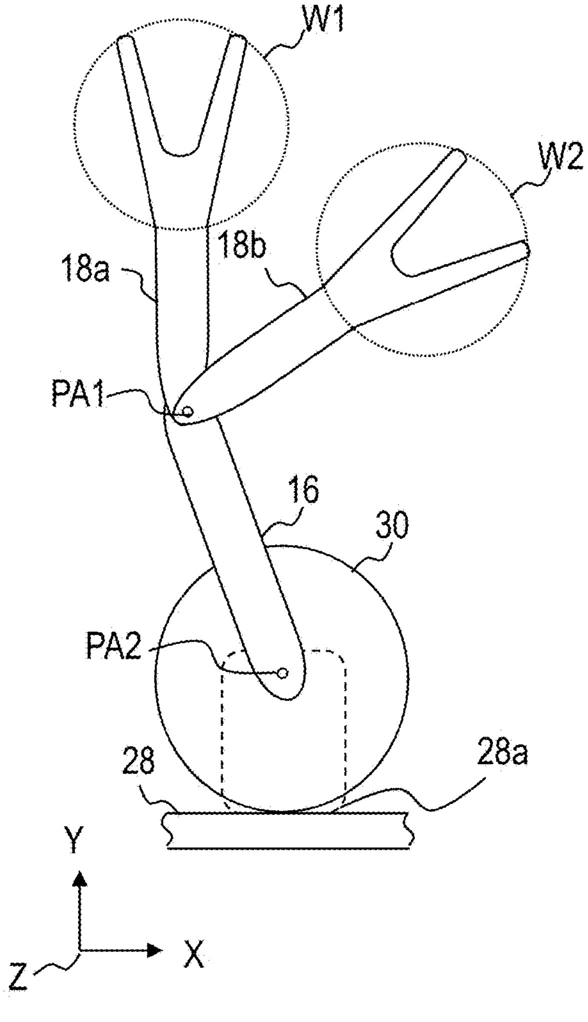

FIG. 1D depicts a dual blade robot similar to the dual blade robot in FIG. 1C; however, in the embodiment of FIG. 1D, the dual blade robot includes a track 28 for translational motion of the base 30 and the dual arm robot along the track 28. The track 28 can be linear or curved. In the embodiment of FIG. 1D, the first arm 16 is pivotally coupled to a translating member 28*a* about pivot axis PA2, and the translating member 28*a* is movable along the track 28. Additionally, in the embodiment of FIG. 1D, the dual blade robot includes the base 30 for rotational motion about a Z axis coinciding with axis PA2 and/or Z-axis translational motion of the dual arm robot along axis PA2.

Figure 1E:
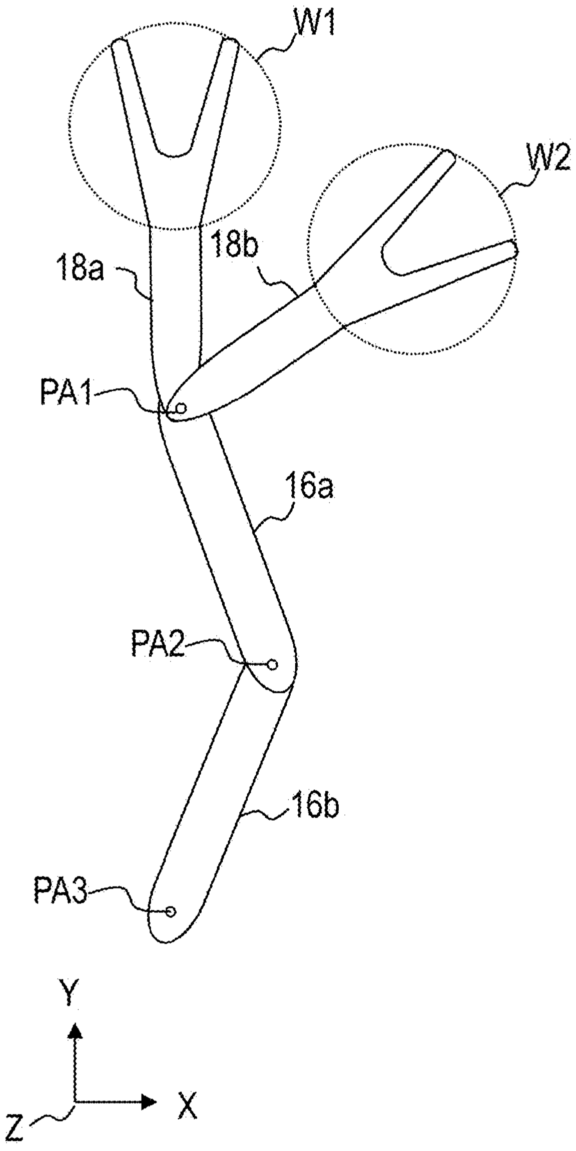

FIG. 1E depicts a dual blade robot similar to the dual blade robot in FIG. 1A; however, in the embodiment of FIG. 1E, the dual blade robot includes arm 16*a* and arm 16*b*. The blades 18*a*, 18*b* are each pivotally coupled to the arm 16*a* about pivot axis PA1, the arm 16*a* is pivotally coupled to the arm 16*b* about pivot axis PA2, and the arm 16*b* is pivotally coupled at a fixed location about pivot axis PA3.

Figure 1F:
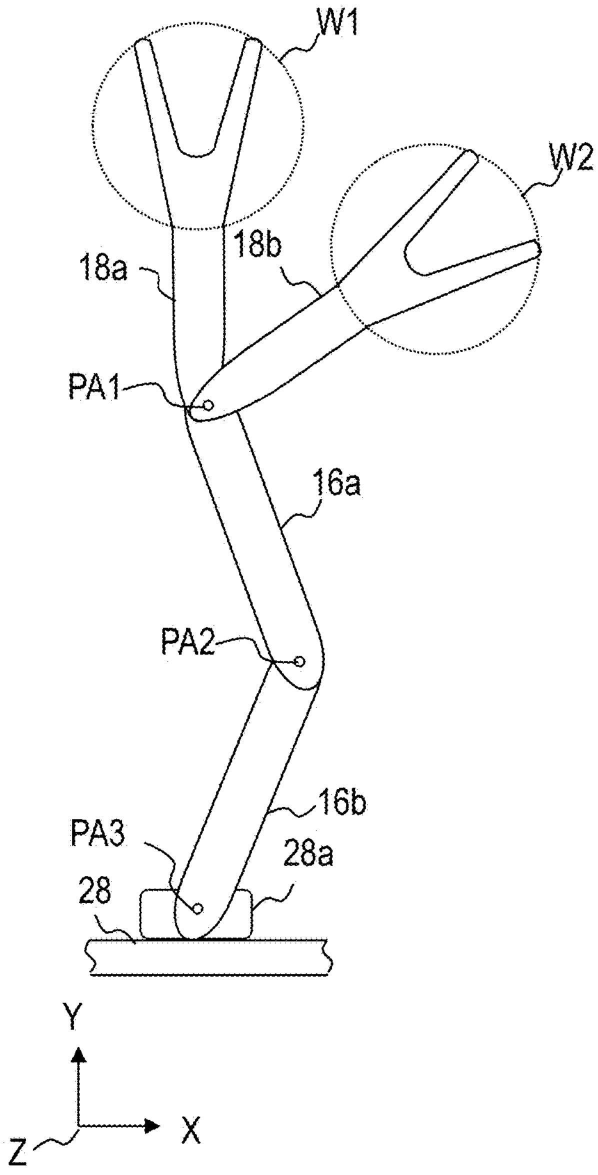

FIG. 1F depicts a dual blade robot similar to the dual blade robot in FIG. 1E; however, in the embodiment of FIG. 1F, the dual blade robot includes a track 28 for translational motion of the dual arm robot along the track 28. The track 28 can be linear or curved. In the embodiment of FIG. 1F, the arm 16*b* is pivotally coupled to a translating member 28*a* about pivot axis PA3, and the translating member 28*a* is movable along the track 28.

Figure 1G:
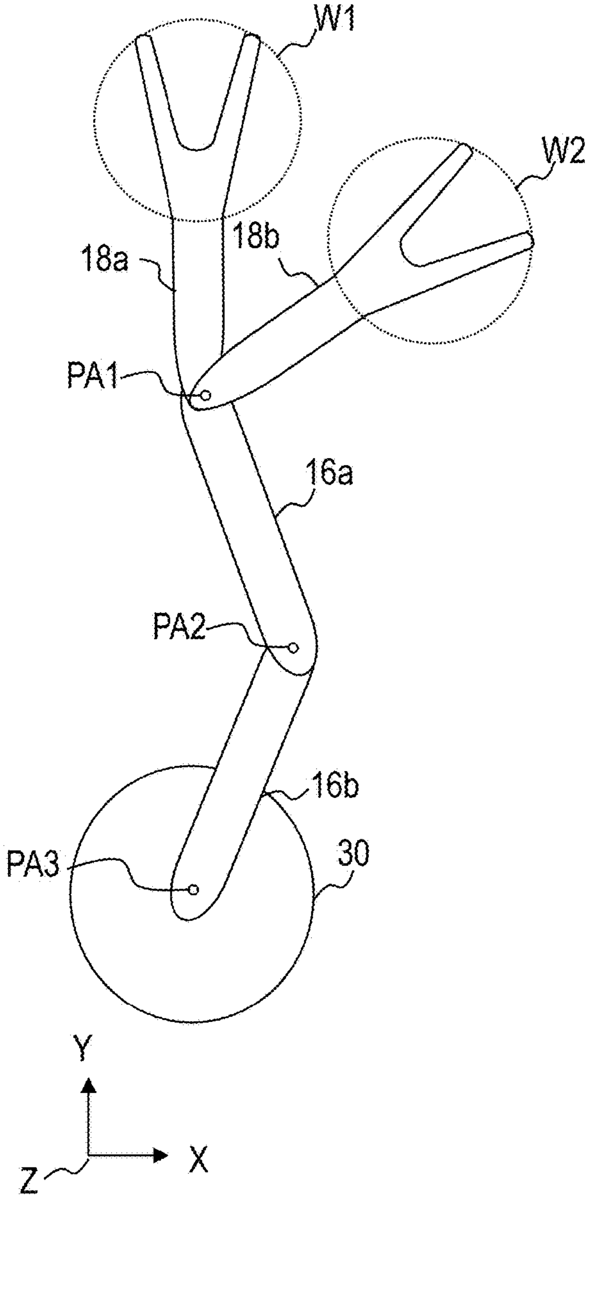

FIG. 1G depicts a dual blade robot similar to the dual blade robot in FIG. 1E; however, in the embodiment of FIG. 1G, the dual blade robot includes a base 30 for rotational motion about a Z axis (independent of or in combination with the rotational motion of the arm 16*b* at axis PA3) coinciding with axis PA3 and/or Z-axis translational motion of the dual arm robot along axis PA3.

Figure 1H:
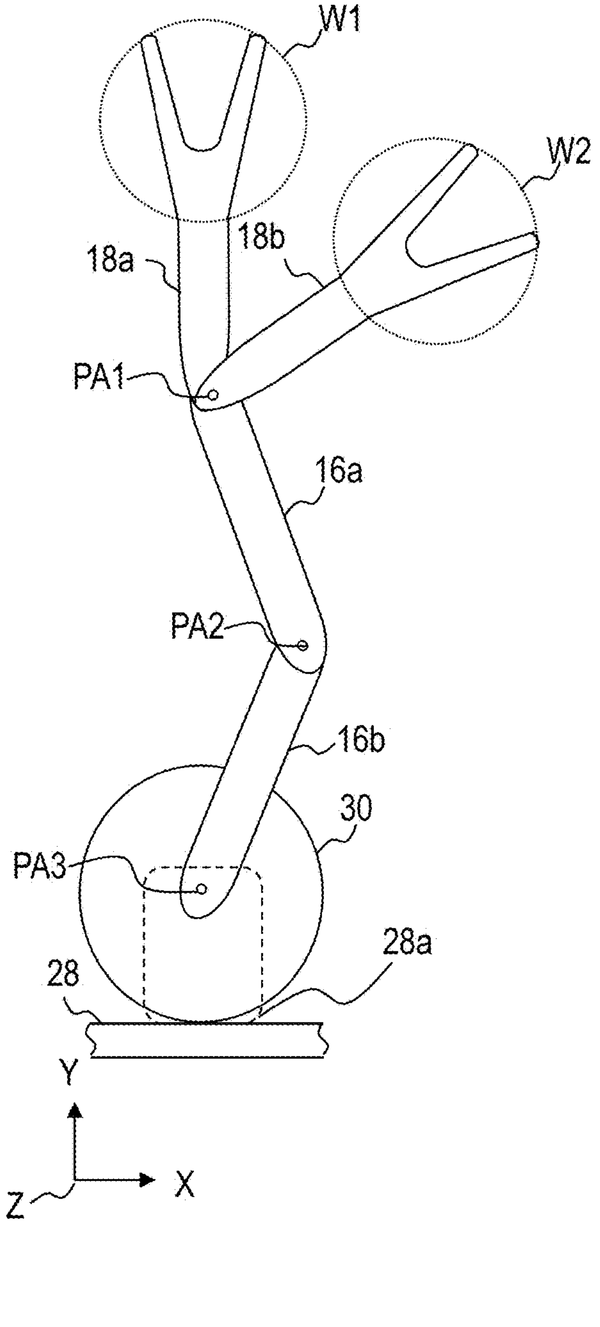

FIG. 1H depicts a dual blade robot similar to the dual blade robot in FIG. 1G; however, in the embodiment of FIG. 1H, the dual blade robot includes a track 28 for translational motion of the base 30 and the dual arm robot along the track 28. The track 28 can be linear or curved. In the embodiment of FIG. 1H, the arm 16*b* is pivotally coupled to a translating member 28*a* about pivot axis PA3, and the translating member 28*a* is movable along the track 28. Additionally, in the embodiment of FIG. 1H, the dual blade robot includes the base 30 for rotational motion about a Z axis coinciding with axis PA3 and/or Z-axis translational motion of the dual arm robot along axis PA3.

Additional arms can be added in addition to arms 16*a*, 16*b* if needed or desired.

Each member (i.e., arm, blade, translating member, base, etc.) of the dual blade robots in FIGS. 1A-1H is actively controlled by drive unit(s) and controlled by one or more control units in the manner disclosed in U.S. application Ser. No. 15/644,828.

There is a need for an apparatus and method that can achieve an optimal wafer swap time while not exceeding a maximum acceleration, for example, in a case of friction grip handling or vacuum handling.

Figure 2:
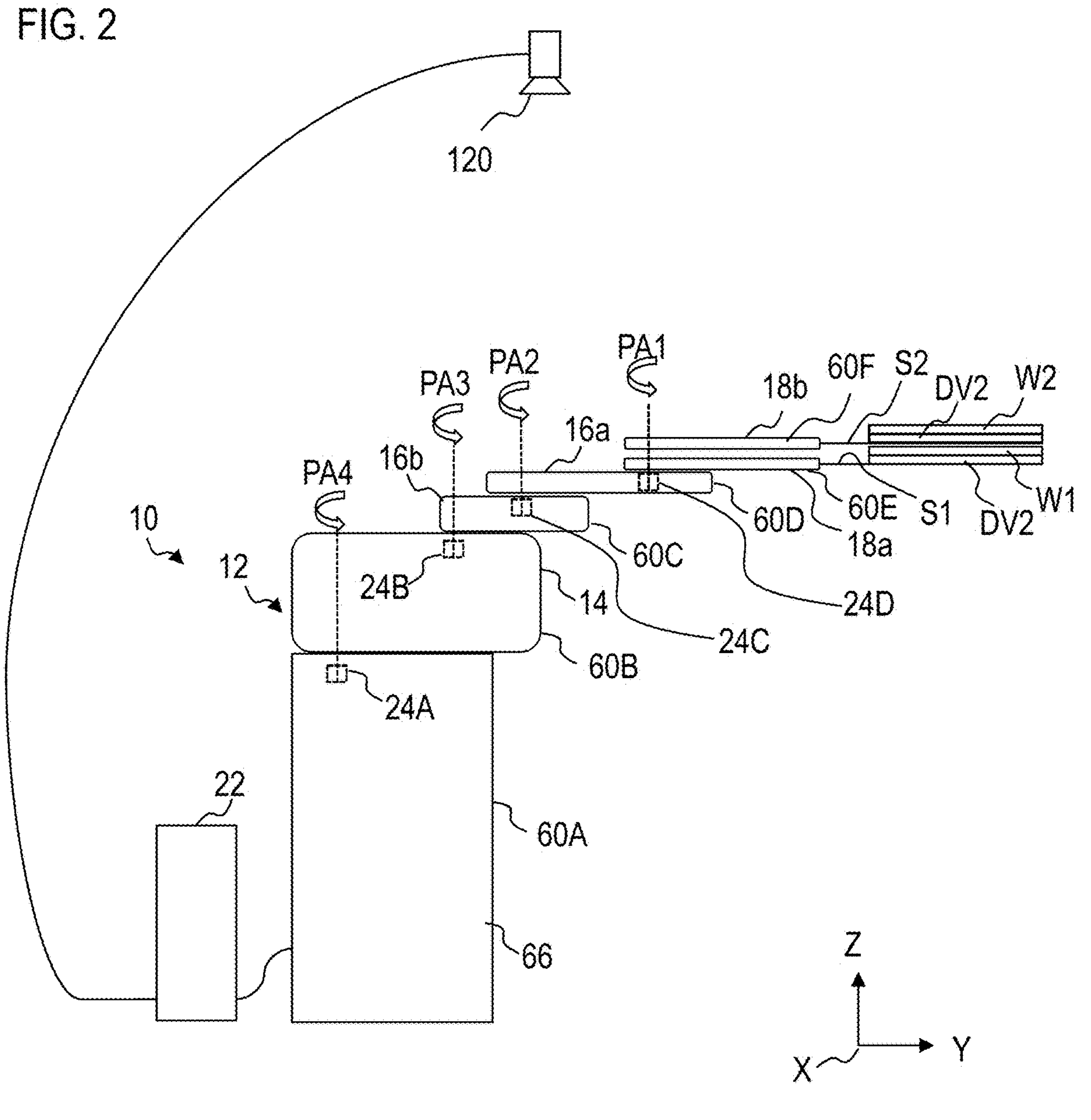
FIG. 2 is a diagram illustrating a robot and a control unit according to an exemplary embodiment of the present invention.

A configuration of a robotic apparatus 10 will be described according to an exemplary embodiment of the invention. FIG. 2 is an exemplary robotic apparatus 10 that includes a transfer robot (or robot) 12 and a robot controller (or control unit) 22. The robot 12 includes a plurality of arm members that are rotatable with respect to each other. The robot 12 shown in FIG. 2 incorporates elements from, for example, the dual blade robot shown in FIG. 1E.

The robot 12 of FIG. 2 includes a torso 14, arm 16*b*, arm 16*a*, first end effector 18*a*, and second end effector 18*b*, which are each exemplary arm members, each of which is rotated by a drive unit, such as drive units 24A-24D (collectively referenced as drive units) provided therein or in association therewith. In the embodiment shown in FIG. 2, both the first end effector 18*a* and the second end effector 18*b* are rotated by drive unit 24D in opposite rotational directions from one another using a gear arrangement or two separate drive units can be provided that each respectively rotates one of the first end effector 18*a* and the second end effector 18*b*.

As illustrated in FIG. 2, the torso 14 is rotatable about pivot axis PA4, the arm 16*b* is rotatable about pivot axis PA3, the arm 16*a* is rotatable about pivot axis PA2, and the first end effector 18*a* and the second end effector 18*b* are each rotatable about pivot axis PA1. The first end effector 18*a* is connected to a distal end of the arm 16*a* and includes a surface S1 that supports a substrate W1, such as a semiconductor wafer. The second end effector 18*b* is connected to a distal end of the arm 16*a* and includes a surface S2 that supports a substrate W2, such as a semiconductor wafer. Substrates W1 and W2 are examples of workpieces. Workpieces other than semiconductor wafers can be transported in the manner discussed below. The first end effector 18*a* and the second end effector 18*b* can each include at least one device, DV1 and DV2, respectively, such as an edge-gripping device and/or a suction device in order to help retain the wafer on the supporting surface S1 and S2, respectively, during movement.

The arm 16*a* is connected to a distal end of arm 16*b*. The arm 16*b* is connected to a distal end of torso 14, which is in turn connected to base 66. Therefore, base 66 supports torso 14, arm 16*b*, arm 16*a*, the first end effector 18*a*, and the second end effector 18*b*. The base 66 includes a housing 60A, the torso 14 includes a housing 60B, the arm 16*b* includes a housing 60C, the arm 16*a* includes a housing 60D, the first end effector 18*a* includes a housing 60E, and the second end effector 18*b* includes a housing 60F (collectively referenced as housing). Robot 12 can be formed as a Selective Compliance Assembly robot (SCARA robot), for example.

Control unit 22 outputs commands to bring each of the torso 14, arm 16*b*, arm 16*a*, first end effector 18*a*, and second end effector 18*b* into motion, as will be described in further detail below. Control unit 22 can be included outside the housing of robot 12 as depicted in FIG. 2, or inside the housing of robot 12. Control unit 22 communicates with robot 12 and the drive units directly, or in conjunction with an intermediate control device, which can include an amplifier. When an amplifier is included as an intermediate device, control unit 22 is configured to issue commands to the amplifier, which in turns generates control signals for one or more of the drive units. Control unit 22 can also receive instructions from a higher-level device such as a programmable logic controller, for example.

As illustrated in FIG. 2, the torso 14 is rotatable about pivot axis PA4, the arm 16*b* is rotatable about pivot axis PA3, the arm 16*a* is rotatable about pivot axis PA2, and the first end effector 18*a* and the second end effector 18*b* are rotatable about pivot axis PA1. This rotational motion is accomplished by a corresponding drive unit constituted by a motor drive or servo motor, for example. Control unit 22 is configured to control the drive units for each of the torso 14, arm 16*b*, arm 16*a*, and first end effector 18*a* and the second end effector 18*b*. Each drive unit provides feedback that indicates at least a position of the drive unit to control unit 22. The position feedback is provided directly from the respective drive units, which perform torque-sensing, from an external sensor 120, or any combination of torque-sensing drive units and external sensors. External sensor 120 can include some components. Control unit 22 controls the operation of drive units in accordance with the feedback information to control the position of each of the torso 14, arm 16*b*, arm 16*a*, first end effector 18*a*, and the second end effector 18*b*.

Figure 3:
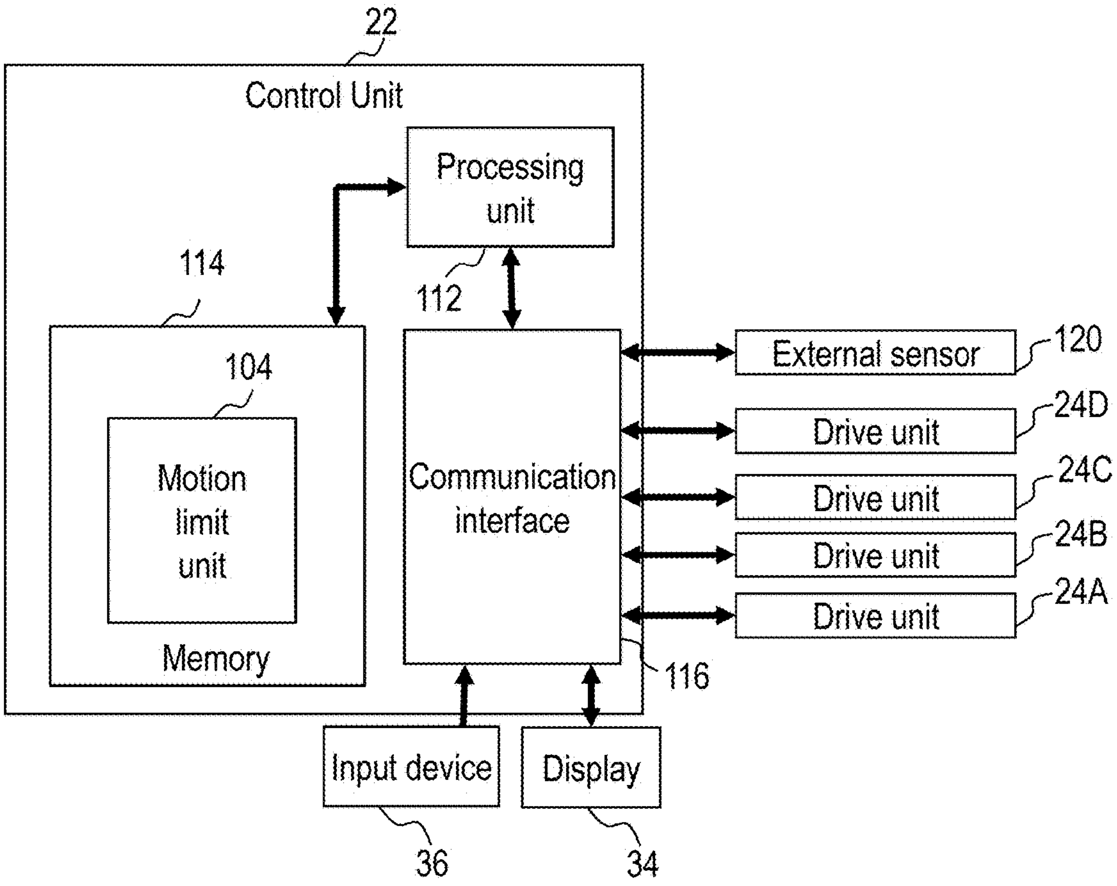
FIG. 3 is a block diagram illustrating a control unit and drive units according to an exemplary embodiment of the present invention.

FIG. 3 illustrates an exemplary configuration of the control unit 22. As illustrated in FIG. 3, the drive units are each in communication with control unit 22. Although four drive units 24A-24D are depicted in FIG. 3, additional drive units can be provided for each respective axis, including torso 14, arm 16*b*, arm 16*a*, first end effector 18*a*, and the second end effector 18*b*. Control unit 22 includes a processing unit 112 and a memory 114. Processing unit 112 is a processing device such as a microprocessor or CPU and communicates with memory 114 and executes instructions (e.g., software programs) provided by motion limit unit 104, which is stored in memory 114, which is a long-term non-volatile storage device such as a hard disk, solid state storage device, EEPROM, or other non-transitory storage medium. Motion limit unit 104 allows control unit 22 to command the drive units based on an allowable motion limits (velocity, acceleration, etc.) applied when robot 12 is brought into motion in order to transport substrates W1, W2.

Control unit 22 is in communication with a user interface that includes an input device 34 and a display 36 that can include a visual display and audio input/output capabilities. Control unit 22 includes a wired and/or wireless communication interface 116 to communicate with input device 34 and display 36, and can also include a volatile memory. Communication interface 116 accepts input from input device 36, which can include a mouse and/or keyboard, and controls display 34 to display information to a user. Communication interface 116 can also receive feedback from each of the drive units and output commands to the respective drive units. If an external sensor 120 is used to provide position feedback, this feedback information is also received by communication interface 116. The issuance of commands to the drive units and the receipt of feedback can be accomplished by direct communication or through an intermediate device such as an amplifier.

A user can interact with input device 36 to configure the allowable motion limits (velocity, acceleration, etc.) set by motion limit unit 104. Thus, a user can observe the allowable motion limits with display 34 and set and/or modify the allowable motion limits with input device 36. Input device 36 and display 34 can be components of control unit 22 or provided as parts of a separate personal computer that communicates with communication interface 116.

Communication interface 116 of control unit 22 can be configured to receive data from display 34, input device 36, and the drive units. Alternatively, a separate communication interface 116 can be provided for the drive units alone. In this case, communication interface 116 for the drive units receives feedback from the drive units, via a cable, for example, and provides this feedback to processing unit 112. The communication interface 116 for the drive units outputs commands to control the drive units directly or through an intermediate device such as an amplifier.

Figure 4A:
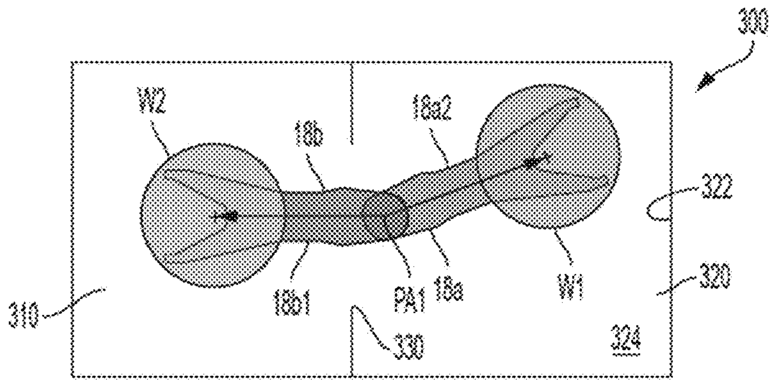
FIGS. 4A-4E are plan views of a workspace of a wafer processing apparatus showing a wafer swap operation using a dual blade robot.

One of the basic robot motions for a dual blade robot is the wafer swap operation at a wafer processing apparatus 300, as can be seen in FIGS. 4A-4E. Typically, a wafer will start at a process position, from which the wafer is to be removed by an active blade (i.e., the blade inside of the processing chamber). On the inactive (passive) blade (i.e., the blade outside of the processing chamber, but within a supply/output chamber), the robot will have possession of a wafer to be placed at the process station. For the purpose of this discussion, it is assumed that an empty blade has been inserted into the processing chamber, a move that was previously optimized, for example, for a friction grip in U.S. application Ser. No. 15/644,828. It is also assumed that the robot has moved in a Z direction (i.e., height direction) and picked the processed wafer off the process pedestal or pins. The processed wafer is now ready to be swapped for the unprocessed wafer on the inactive blade. The motion is roughly as shown in FIG. 4A, which is a first figure in a sequence of figures including FIGS. 4A-4E.

Thus, FIG. 4A shows a processed wafer, which in FIG. 4A is substrate (or wafer) W2, at a processing location that is in processing chamber 310 of the wafer processing apparatus 300, and an unprocessed wafer, which in FIG. 4A is substrate (or wafer) W1, at a supply/output location that is in supply/output chamber 320 of the wafer processing apparatus 300. In FIG. 4A, the wafer W2 is provided on the second end effector 18*b*, which in FIG. 4A is considered to be an active blade (i.e., the blade inside of the processing chamber 310) 18*b*1, while the wafer W1 is provided on the first end effector 18*a*, which in FIG. 4A is considered to be an inactive blade (i.e., the blade outside of the processing chamber 310, but within the supply/output chamber 320) 18*a*1. It is noted that the processing chamber 310 and the supply/output chamber 320 of the wafer processing apparatus 300 are shown in simplified form, and some or all of the remaining components of the robotic apparatus 10 could be positioned within the wafer processing apparatus 300 (e.g., within the supply/output chamber 320 or an adjacent chamber) or outside of the wafer processing apparatus 300 such that the first end effector 18*a* and the second end effector 18*b* reach within the wafer processing apparatus 300 in the manner shown in FIGS. 4A-4E.

Figure 4B:
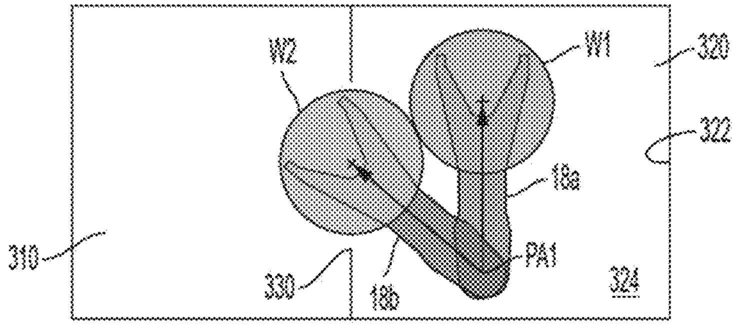

FIG. 4B shows a next orientation/location of the first end effector 18*a* and the second end effector 18*b* in the wafer swap operation after FIG. 4A. In FIG. 4B, the wafer W2 provided on the second end effector 18*b* is moving through an opening 330 between the processing chamber 310 and the supply/output chamber 320, and the wafer W1 provided on the first end effector 18*a* is moving toward the opening 330.

Figure 4C:
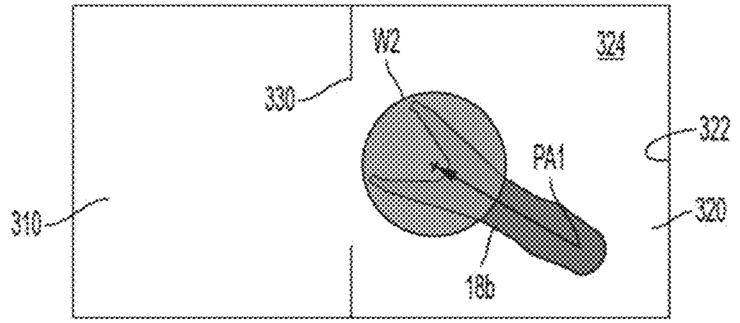

FIG. 4C shows a next orientation/location of the first end effector 18*a* and the second end effector 18*b* in the wafer swap operation after FIG. 4B. In FIG. 4C, the wafer W2 provided on the second end effector 18*b* has moved out of the opening 330 into the supply/output chamber 320, and the wafer W2 on the second end effector 18*b* is directly above (and the obscuring the view of) the wafer W1 provided on the first end effector 18*a* that is moving toward the opening 330.

Figure 4D:
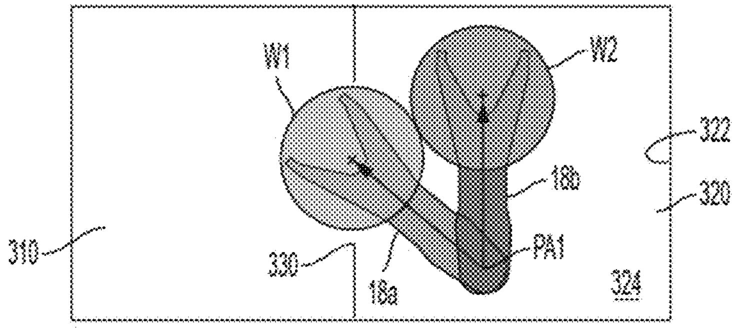

FIG. 4D shows a next orientation/location of the first end effector 18*a* and the second end effector 18*b* in the wafer swap operation after FIG. 4C. In FIG. 4D, the wafer W2 provided on the second end effector 18*b* has moved toward the supply/output location of the supply/output chamber 320, and the wafer W1 on the first end effector 18*a* is moving through the opening 330 into the processing chamber 310.

Figure 4E:
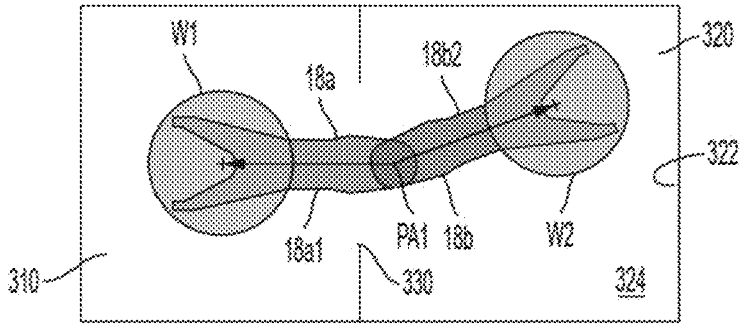

FIG. 4E shows a next orientation/location of the first end effector 18*a* and the second end effector 18*b* in the wafer swap operation after FIG. 4D. In FIG. 4E, the wafer W2 provided on the second end effector 18*b* has moved to the supply/output location of the supply/output chamber 320, and the wafer W1 on the first end effector 18*a* has moved to the processing location in the processing chamber 310. In this orientation/location, the wafer W1 can be processed within the processing chamber 310, and the wafer W2 can be left at the supply/output chamber 320 such that a subsequent wafer can be picked up by the second end effector 18*b* in order to prepare for another (subsequent) wafer swap operation. In FIG. 4E, the first end effector 18*a* is considered to be the active blade (i.e., the blade inside of the processing chamber 310) 18*a*1, while the second end effector 18*b* is considered to be the inactive blade (i.e., the blade outside of the processing chamber 310, but within the supply/output chamber 320) 18*b*2.

It is noted that, in performing the motion shown in FIGS. 4A-4E, there are at least two primary collisions to be concerned with given the spatial limitations (in addition to the collision with the opening 330 between the processing chamber 310 and the supply/output chamber 320). First, the inactive wafer (i.e., the wafer on the inactive blade that is outside of the processing chamber, but within the supply/output chamber) may hit either a top wall (not shown but above bottom wall 324) of the supply/output chamber or a back wall 322 of the supply/output chamber 320. Secondly, the wrist (i.e., the first end effector 18*a* and the second end effector 18*b* joined at pivot axis PA1) may collide with a bottom wall 324 of the supply/output chamber 320.

As will be discussed in further detail below, there are four degrees of freedom associated with the kinematics of a dual blade swap. When a linear motion profile is applied to the active blade (i.e., the blade inside of the processing chamber) at the wafer being extracted from the process station, then this accounts for two degrees of freedom. The third degree of freedom is the orientation of the active blade. Often times, the orientation will be held fixed but it can also vary through movement. The inactive blade, that which is holding the unprocessed wafer, will follow a line constraint that will intersect at a point with the line defining the active blade. The point of intersection is represented in FIG. 4C. At this point (which is at a point of singularity), the extraction portion has been completed and the velocity of both blades is zero. The robot then proceeds to insert the unprocessed wafer into the station and clears the processed wafer using the same paths as before, simply applied to the different blades.

In such a movement (paths of motion) as are shown in FIGS. 4A-4E, the fact that the wafers need to come to rest at their point of coincidence represents an unfortunate loss of time. An improvement over such a motion is needed, as is discussed below. Such motion should allow a robot used for wafer transferring to quickly and precisely transfer a wafer between various locations to reduce manufacturing time and ensure sufficient yield. A need exists for devices that can increase the yield of a manufacturing operation, thereby reducing cost and increasing output over time.

Kinematics

There are four degrees of freedom in the planar, dual blade kinematics. We can command the x-y position of both the active wafer and the passive wafer. Both wafers can be driven simultaneously so long as the distance between the wafers is less than twice the end effector length. When the two wafers come in close proximity with one another, the position of the wrist can vary wildly as the wrist position is indeterminate when the wafers are coincident, as this represents a point of singularity. This can lead to unacceptable accelerations at the wrist.

Figure 5:
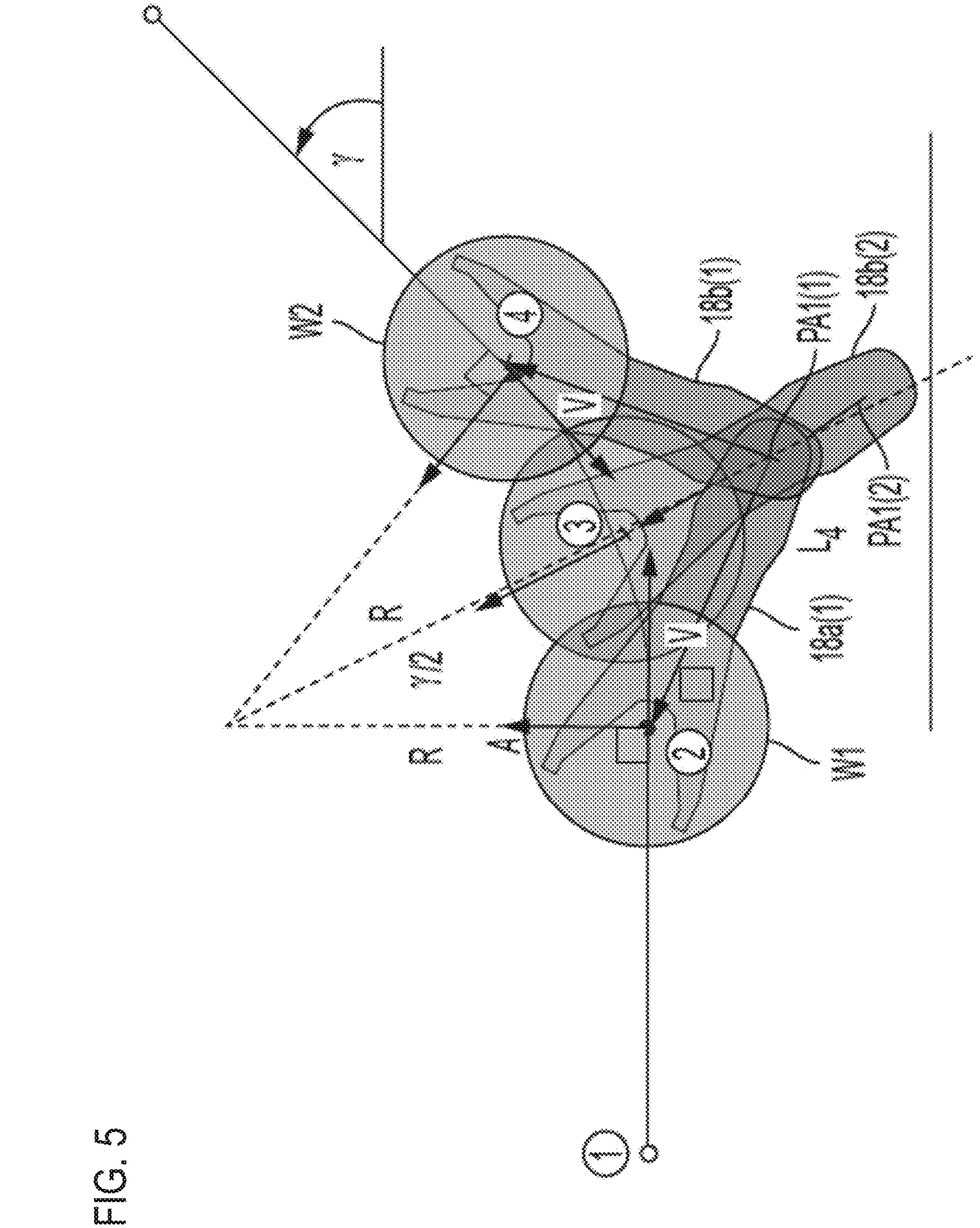
FIG. 5 depicts first and second end effectors performing a portion of the wafer swapping operation according to an exemplary embodiment of the present invention.

Thus, we want to command linear wafer acceleration on both wafers until the wafers come in close proximity with one another. We then want to transition to a model that keeps the wrist acceleration and position stable. We can do so by applying some symmetry of motion between the two wafers. As shown in FIG. 5, from position ① to position ②, the wafer (in this depiction wafer W1) will accelerate and potentially decelerate along a linear path. At position ②, the active wafer will enter into an arc segment (from position ②, through position ③, to position ④) of radius, R, with velocity, V. Simultaneously, the passive wafer (in this depiction wafer W2) will enter at the other side of the same arc at position ④ with the same velocity, V. The wrist of the robot will be on a line of symmetry passing through the center of the arc at position ③. The wrist will move along this line of symmetry during this move segment, as can be seen by the location of the pivot axis as it moves from pivot axis PA1(1) (when first end effector 18*a*(1) is at position ② and second end effector 18*b*(1) is at position ④) to pivot axis PA1(2) (when first end effector 18*a*(2) is at position ③ and second end effector is also at position ③ but obscured from view by the first end effector 18*a*(2) above it). The wafers move along the arc at constant tangential speed, experiencing no tangential acceleration. Given the symmetry, the wafers will be instantaneously coincident at position ③. The previously active wafer will exit the arc with the same velocity. Note that, in FIG. 5, the first end effector 18*a*(1) has a center of a workpiece holding position that is located at position ②, which also corresponds to a center of the workpiece W1 supported by the first end effector 18*a*(1). Similarly, note that, in FIG. 5, the second end effector 18*b*(1) has a center of a workpiece holding position that is located at position ④, which also corresponds to a center of the workpiece W2 supported by the second end effector 18*b*(1).

Figure 6:
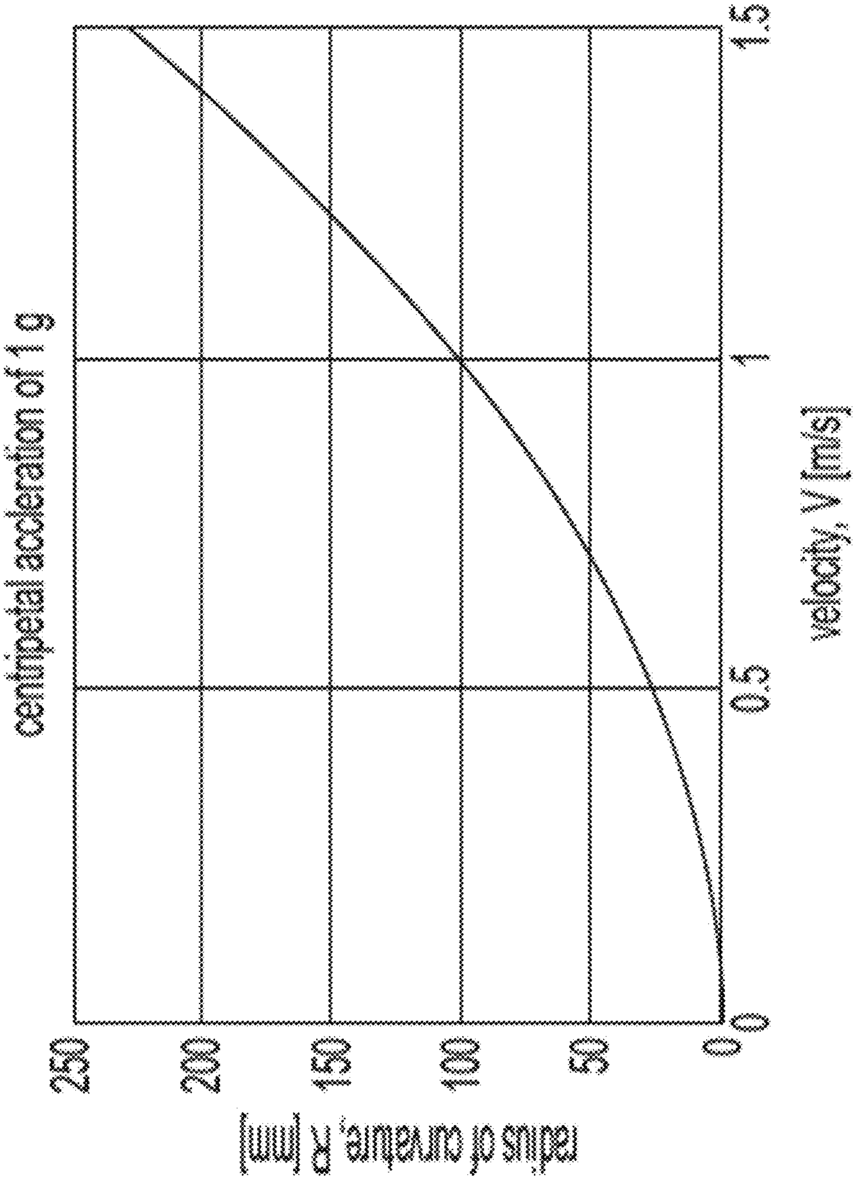
FIG. 6 is a graph of an acceptable radius of curvature as a function of tangential velocity for a commanded acceleration of 1 g.

For a given arc entrance velocity, V, and commanded acceleration, A, we can determine the minimum radius of curvature, $$R=V^2/A$$

where A is the allowable acceleration. In this case, for zero tangential acceleration and constant velocity, the acceleration is purely centripetal and optimized. FIG. 6 is a graph of an acceptable radius of curvature as a function of tangential velocity for a commanded acceleration of 1 g.

Wrist Kinematics Through Arc

Figure 7:
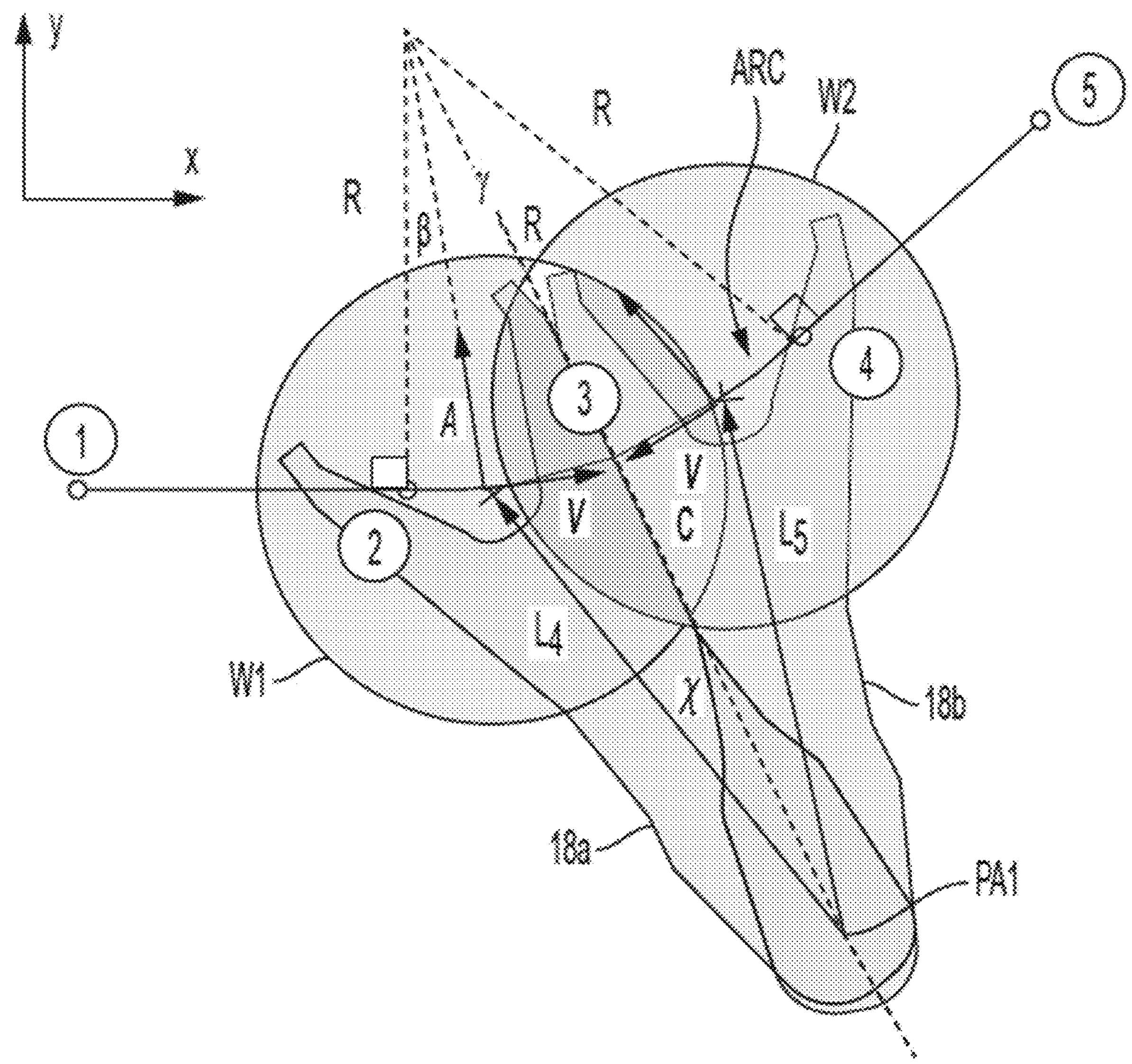
FIG. 7 depicts first and second end effectors during a portion of the wafer swapping operation according to an exemplary embodiment of the present invention.

The constant velocity motion of the wafer on the arc is easily defined by the angle, β. Given the designed symmetry of the motion through the arc segment, the wrist will always remain on the line of symmetry as shown by pivot axis PA1 in FIG. 7. In FIG. 7, the first end effector 18*a* with wafer W1 is moving along the arc ARC from position ② to position ③ and the second end effector 18*b* with wafer W2 is moving along the arc ARC from position ④ to position ③. We want to determine the location of the wrist as the wafers move along the arc. In FIG. 7, position ① can be considered a first start position (or a second end position), position ② can be considered a first arc position, position ③ can be a central or coincident position (or a third arc position), position ④ can be considered a second arc position, and position ⑤ can be considered a second start position (or a first end position).

From FIG. 7, we can see from the law of cosines, $$L_4^2 = R^2 + C^2 - 2*R*C*\cos(\gamma/2-\beta).$$

Where C is the distance from the center of curvature to the wrist.

$$a=1$$

$$b = 2*R*\cos(\gamma/2-\beta)$$

$$c = R^2 - L_4^2$$

We can use the quadratic equation, $$C = (-2*R*\cos(\gamma/2-\beta) + /sqrt(4*R^2*\cos^2(\gamma/2-\beta) - 4*(R^2-L_4^2)))/2$$

$$C = -R*\cos(\gamma/2-\beta) + /sqrt(R^2*\cos^2(\gamma/2-\beta) - R^2 + L_4^2).$$

Once we have C, χ is easily found from the law of cosines.

Wrist Limitation Given Environment

Figure 8:
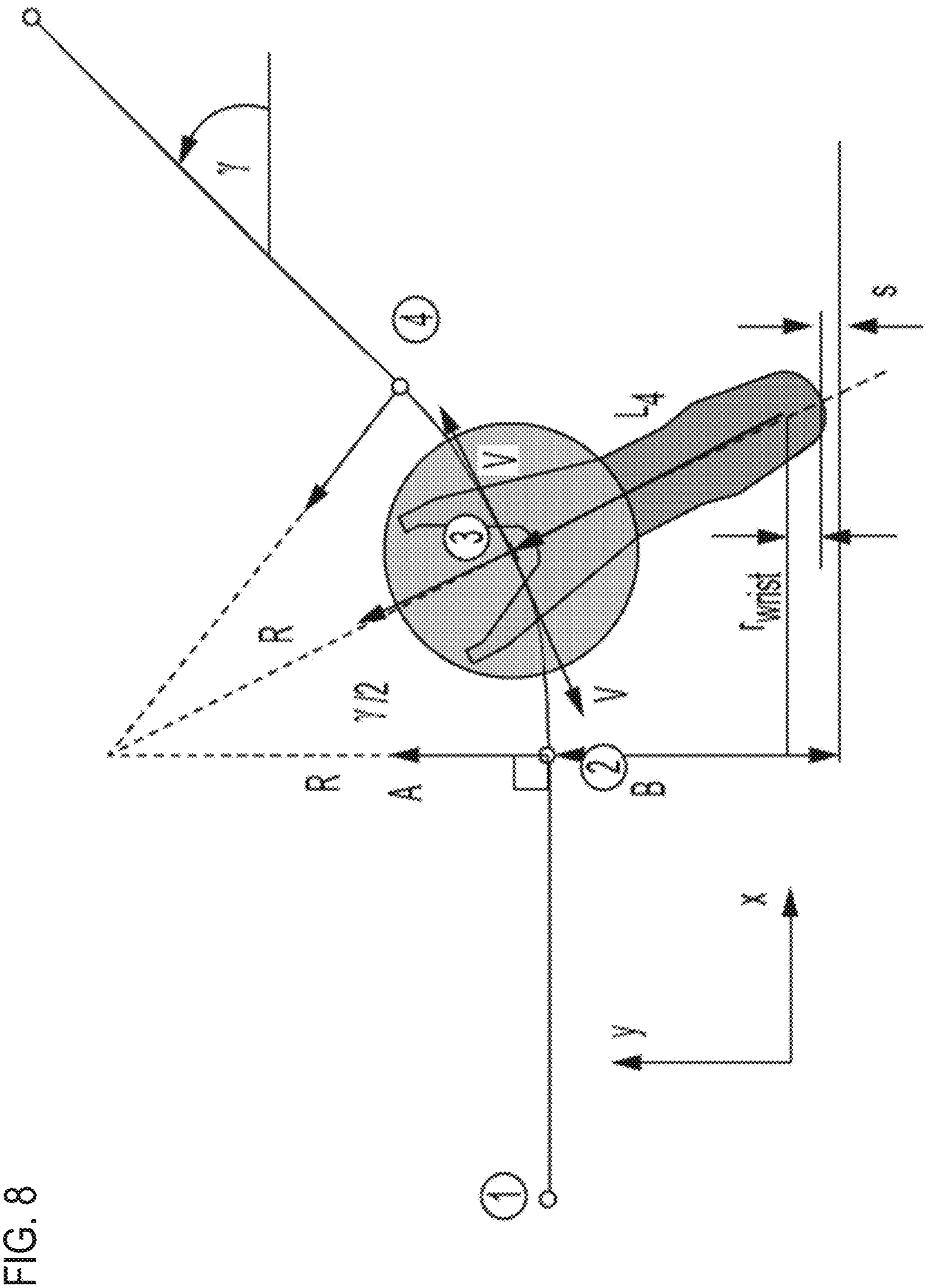
FIG. 8 depicts the end effectors at a central or coincident position while performing the wafer swapping operation according to an exemplary embodiment of the present invention.

In the following and in conjunction with FIG. 8, we consider spatial considerations given the geometry of the blades, the wafers, and the surrounding environment.

The process station can be a distance, B, from a side wall. Given the length of the end effector, $L_4$, the minimum allowable clearance, s, and the radius of the robot wrist, $r_{wrist}$, the following must be maintained.

$$(R+L_4)*\cos(\gamma/2) < R + B - r_{wrist} - s$$

From this, we can determine the minimum angle, gamma.

$$\gamma_{min} > 2*\mathrm{acos}((R+B-r_{wrist}-s)/(R+L_4)).$$

Swap Motion

In the above, we consider a line—arc—line segment approach (i.e., line between point ① and point ②, arc between point ② and point ④, and line between point ④ and point ⑤). It should be noted that a line-arc-arc segment is also a possibility. But considering two line segments, their respective lengths can be either equal or unequal.

Figure 9:
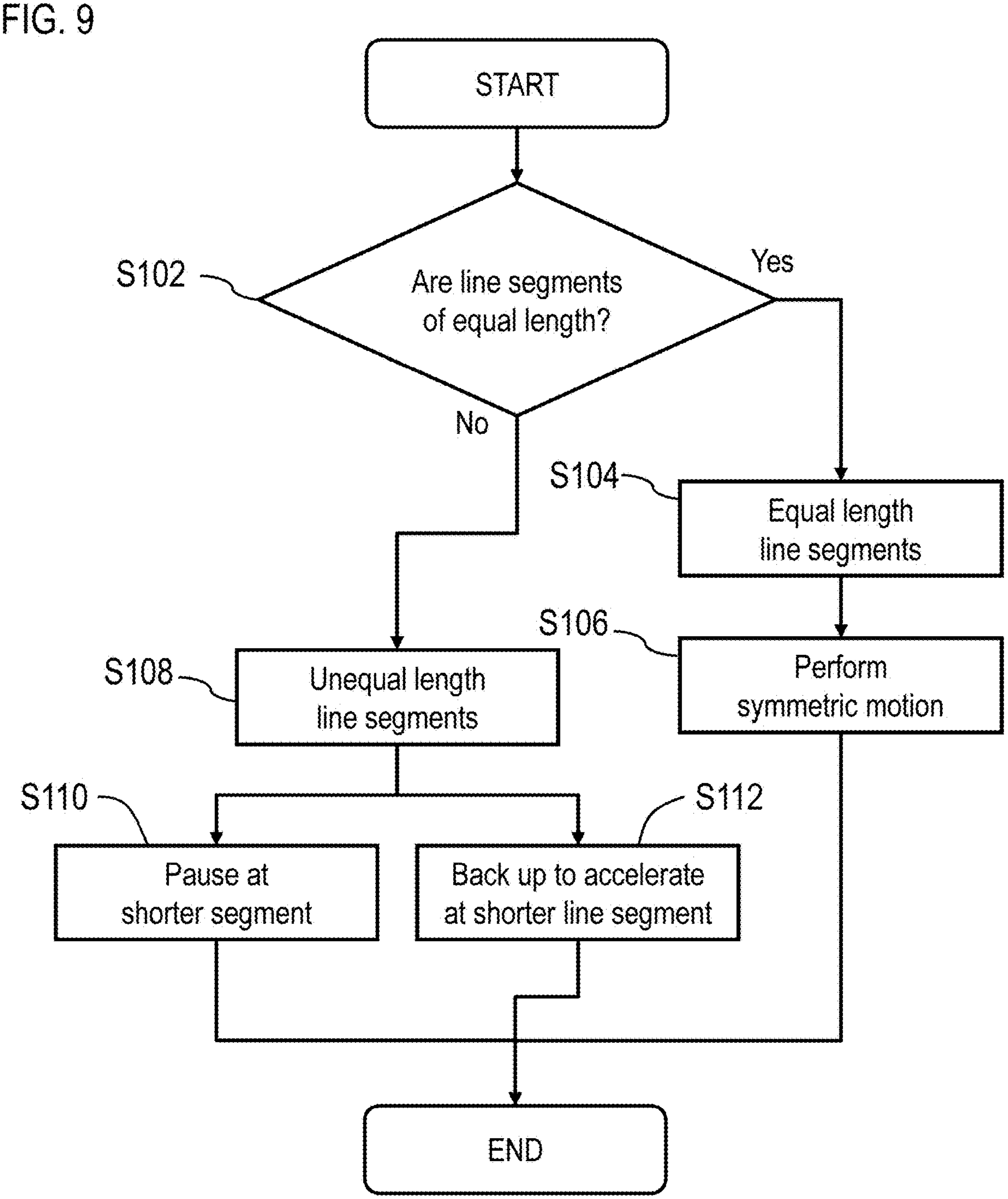
FIG. 9 is a flowchart of possible swap motion operations depending upon line segment lengths according to exemplary embodiments of the present invention.

We will review possible swap motion operations for both below, as depicted in a flowchart in FIG. 9. As shown in FIG. 9, upon start of swap motion operation it will be determined at step S102 whether the line segments are of equal length or unequal length. If the line segments are of equal length, then the process will move to step 104, and, if the line segments are of unequal length, then the process will move to step 108.

Equal Length Line Segments: Symmetric Motion

Figure 10:
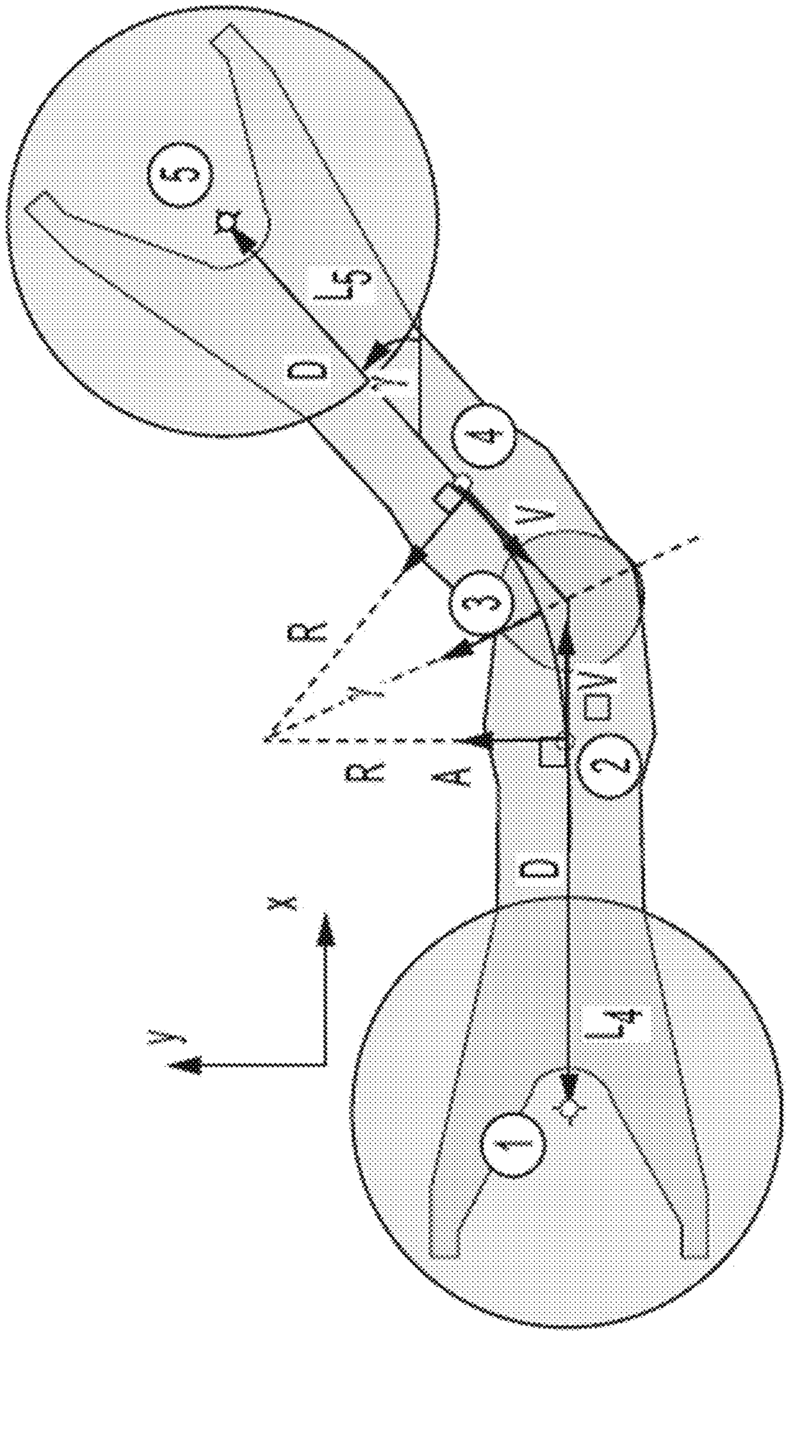
FIG. 10 depicts first and second end effectors during a portion of the wafer swapping operation for explanatory purposes according to an exemplary embodiment of the present invention.

For unequal length line segments, we need to determine the geometric relationship between the intended path and the end effectors. However, we consider a simplified scheme where the line segments are equal in length and the starting position of the end effectors are aligned with the path as shown in FIG. 10 where the wrist will always stay on the line of symmetry. For equal length line segments, a symmetric motion can be performed in step S106.

First, we see that they are readily defined by the following relationship with the end effector length, $$L_4 = D + R * \tan(\gamma/2).$$

This can be an equation considered to be of two unknowns, D and R.

Second, we see that the value of $D_{1\rightarrow2}$ (i.e., distance between point ① and point ②) and $D_{5\rightarrow4}$ (i.e., distance between point ⑤ and point ④) are equal and, more importantly, the acceleration profile for both wafers can be the same. The motion can be symmetric about the line that passes through the center of the radius of curvature and the starting point of the wrist.

Given the symmetry, we assume now that both wafers will accelerate along the entire length, D. One does not need to slow for the other. Both wafers will accelerate with a magnitude $A_{c1}$ to a maximum attainable velocity.

$$D = 1/2 * A_{c1} * t_1^2$$

We can solve for the acceleration time, $$t_1 = sqrt(2 * D/A_c).$$

We can then solve for the velocity at the entrance to the arc.

$$V_c = A_{c1} * t_1$$

$$V_c = sqrt(2 * D * A_{c1}).$$

We must now be concerned for the centripetal acceleration of the wafer, traveling at a constant velocity Vc, as we move along the arc of radius, R.

$$A_{c2} = V^2/R = 2 * D * A_{c1}/R.$$

For constant acceleration, we can determine the relationship between D, R and the accelerations.

$$R = 2 * D * A_{c1}/A_{c2}.$$

If we assume that the linear acceleration and the centripetal acceleration should be the same magnitude, then the equation simplifies further, $$R = 2 * D.$$

This is a very elegant and useful simplification. We see that the design of the path can be completely independent of the acceleration.

Now having our relationship between R and D, we can solve for R and D using the first equation, $$L_4 = D + R * \tan(\gamma/2)$$

$$L_4 = R/2 + R * \tan(\gamma/2)$$

$$R = 2 * L_4/(1 + 2 * \tan(\gamma/2))$$

$$D = L_4/(1 + 2 * \tan(\gamma/2)).$$

Figure 11:
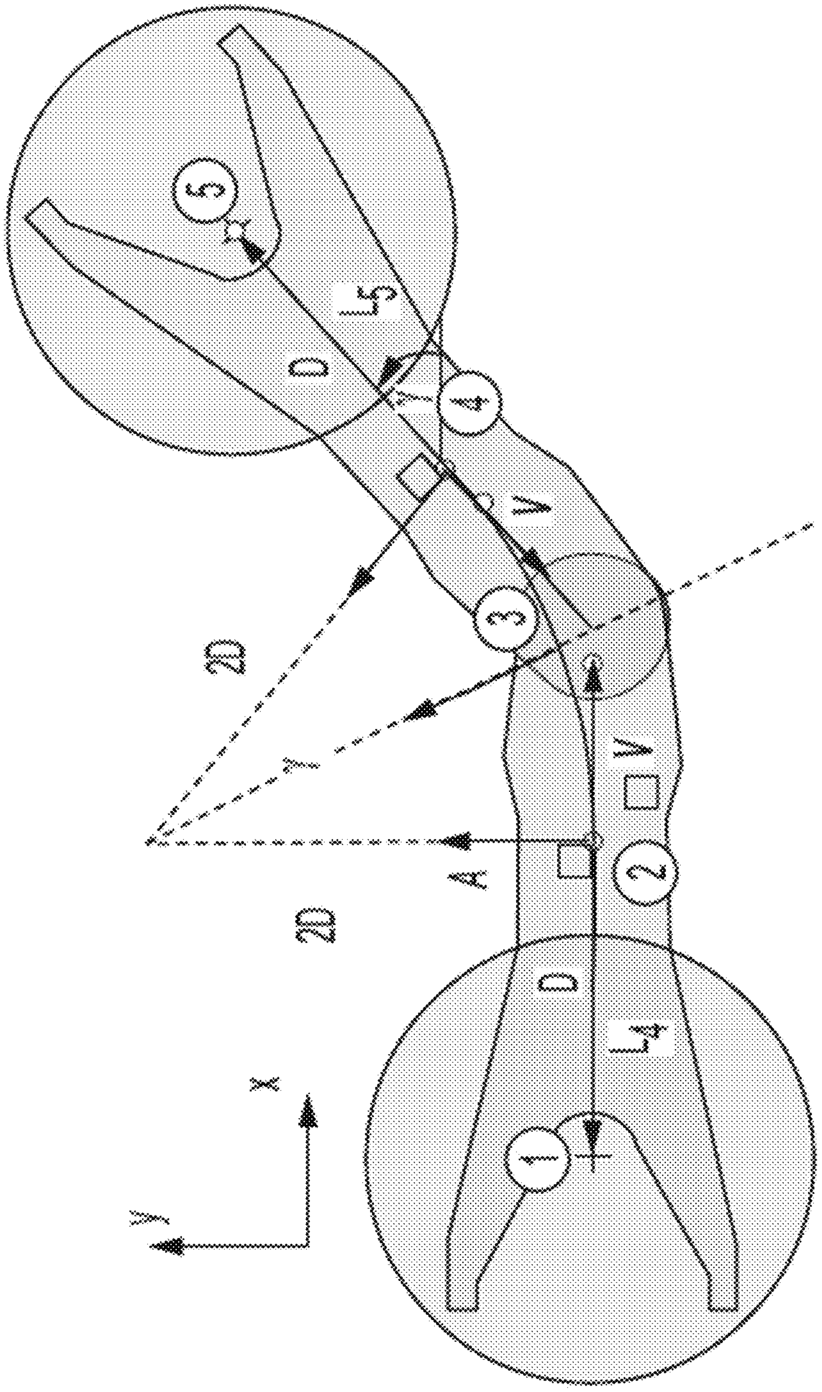
FIG. 11 depicts first and second end effectors during a portion of the wafer swapping operation for explanatory purposes according to an exemplary embodiment of the present invention.
Figure 12A:
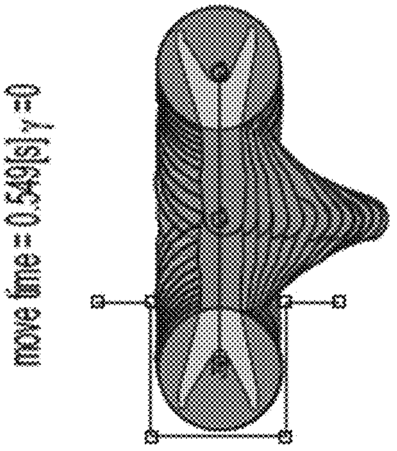
FIGS. 12A-12L depict examples of symmetric motion profiles of first and second end effectors during wafer swapping operations with varying gamma values according to exemplary embodiments of the present invention.
Figure 12B:
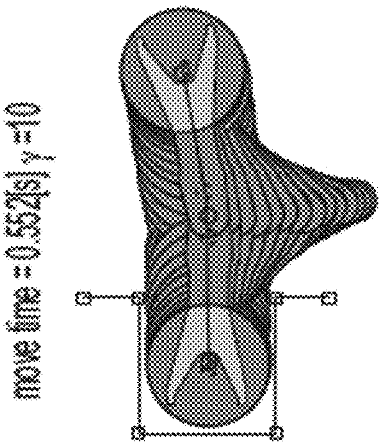
Figure 12C:
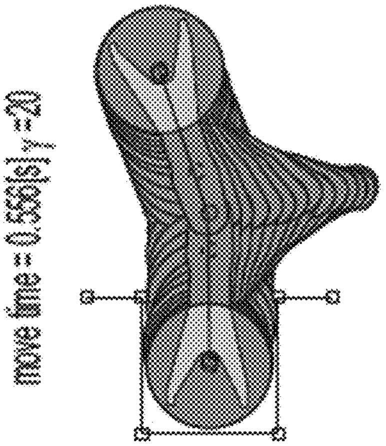
Figure 12D:
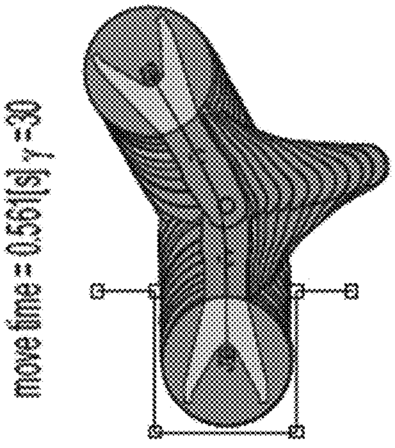
Figure 12E:
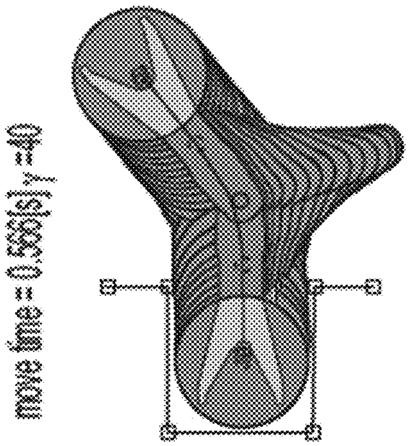
Figure 12F:
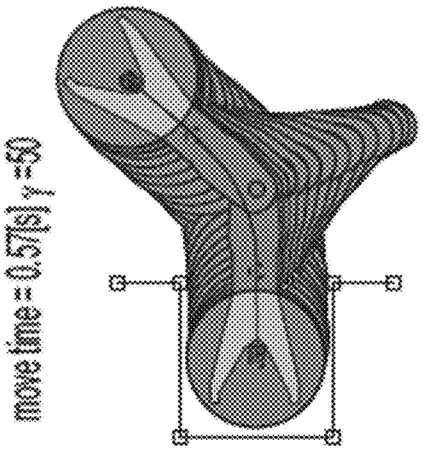
Figure 12G:
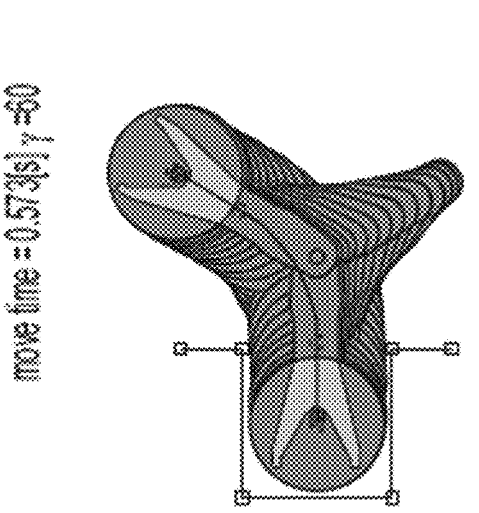
Figure 12H:
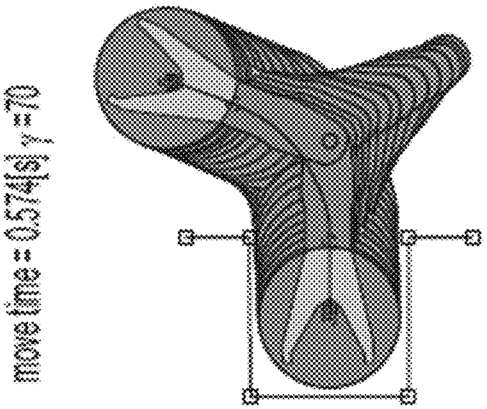
Figure 12I:
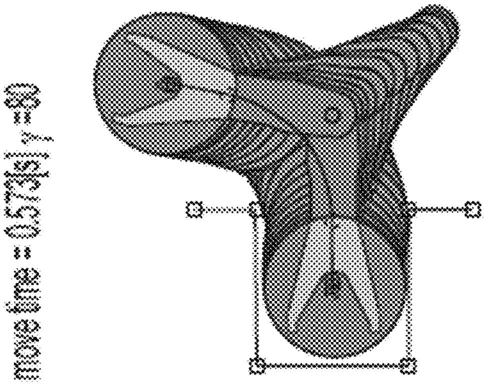
Figure 12J:
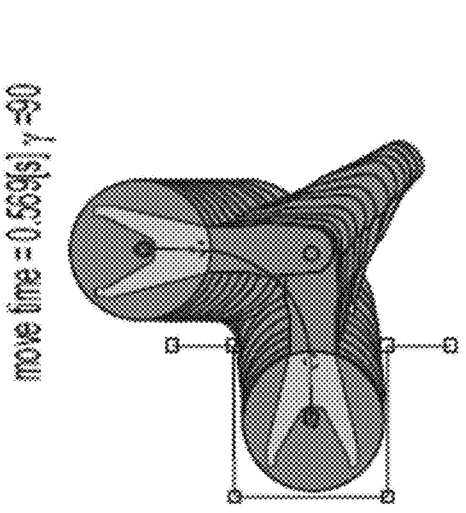
Figure 12K:
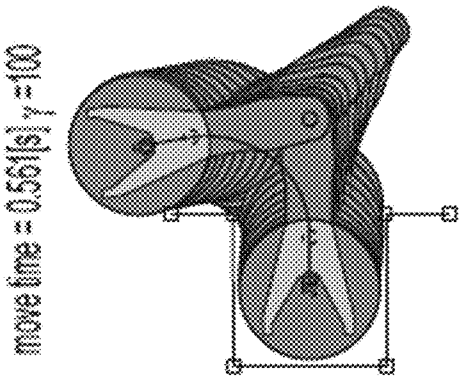
Figure 12L:
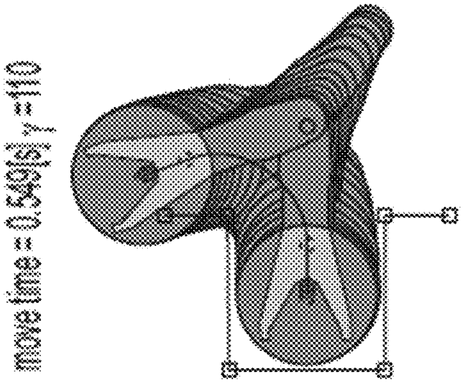

The figure simplifies to FIG. 11.

Time for Symmetric Move

We wish to determine the time required for the total move. The distance traveled during the constant acceleration is defined by the following, $$D = 1/2 * A * t_1^2$$

Solving for the acceleration time, $$t_1 = sqrt(2 * D/A).$$

We know that the velocity is simply, $$V = A * t_1 = sqrt(2 * D * A).$$

The time required for the wafers to travel about the arc is the following, $$t_3 = R * \gamma/V$$

$$t_3 = 2 * D * \gamma/sqrt(2 * D * A)$$

$$t_3 = \gamma * 2 * sqrt(D/(2 * A)).$$

The total move time can thus be found, $$t_f = 2 * t_1 + t_3$$

$$t_f = 2 * sqrt(2 * D/A) + \gamma * 2 * sqrt(D/(2 * A))$$

$$t_f = 2 * sqrt(2 * D/A) + \gamma * 2 * sqrt(D/(2^* A)).$$

Minimum Distance

If the exiting wafer must travel a minimum distance to exit the station, we are essentially defining, D, as that minimum distance. We have a degree of freedom, γ, as shown in FIG. 11

$$L_4 = D_1 + 2 * D_1 * \tan(\gamma/2).$$

Solving for γ, $$\gamma = 2 * \mathrm{atan}((L_4 - D_1)/(2 * D_1)).$$

As an example, we can see that when $L_4=D_1$, gamma=0 which stands to reason.

If $D_1$ is greater than $L_4$, gamma would be negative which is not practical. However, practically speaking, $D_1$ should never be greater than $L_4$ because by this time the wafer center will have crossed the starting location of the wrist. Which, even for a fully inserted end effector would not make sense for a wrist of some radius. The wafer would have already necessarily crossed the exit.

EXAMPLES

A few examples of symmetric motion with varying gamma are depicted in FIGS. 12A-12L, where $L_4$=365 mm.

Unequal Length Line Segments: General Case

In the following we consider a general case of line-arc-line (i.e., line between point ① and point ②, arc between point ② and point ④, and line between point ④ and point ⑤) where the lines (i.e., first line between point ① and point ②, and second line between point ⑤ and point ④) are not necessarily equal length. If the line segments are of unequal length, then the process will move to step 108 in FIG. 9, and two different methods can be used to compensate for the unequal lengths in step S110 or in step S112.

The blade having the longer line segment should be accelerating or decelerating at all times to optimize move time. For example, if the active blade has the longer linear move segment, it will accelerate along the line in the direction of point ② but may have to decelerate to, V, the speed attainable by the inactive wafer.

The inactive wafer, having the smaller distance to travel, can do a number of things. For one, it could hold position for some time delay, allowing the active blade to collapse the wrist. It would then accelerate at maximum acceleration to ensure that it attains the matching velocity V at the point ④ at the same time as the active wafer. The benefit of this type of inactive wafer motion is that the wafers can never be separated by the starting distance. The active wafer is moving in the general direction of the inactive wafer and the inactive wafer is holding still for some time. Furthermore, the inactive blade will not come any closer to the rear wall.

Inactive Blade Pause (Step S110)

The active blade must travel the distance $D_{1\to2}$, arriving at a velocity, V. The inactive blade must travel a distance $D_{4\to5}$, arrive at the same velocity, V. The distance $D_{1\to2}$ will be greater than $D_{4\to5}$.

The active blades motion can be defined by an acceleration of A for $t_1$ seconds followed by a deceleration of A for $t_2$ seconds. The position and velocity of the active blade at the entry into the arc can be defined as in the following, $$X_{1\to2} = 1/2 * At_1^2 + A * t_1 * t_2 - 1/2 * A * t_2^2$$

$$V_2 = A * t_1 - A * t_2 = V.$$

For the inactive blade, we will pause for $t_3$ seconds and then accelerate with a magnitude A for $t_4$ seconds.

The position and velocity of the inactive blade at the entry into the arc can be defined as in the following, $$X_{5\to4} = 1/2 * A * t_4^2 = D_{4\to5}$$

$$V_4 = A * t_4 = V.$$

We know that that moves must start and stop at the same time, $$t_1 + t_2 = t_3 + t_4.$$

We thus have five equations in four unknowns, $$t_4 = sqrt(2 * D_{5\to4}/A).$$

Inactive Wafer Travel Distance

Figure 13:
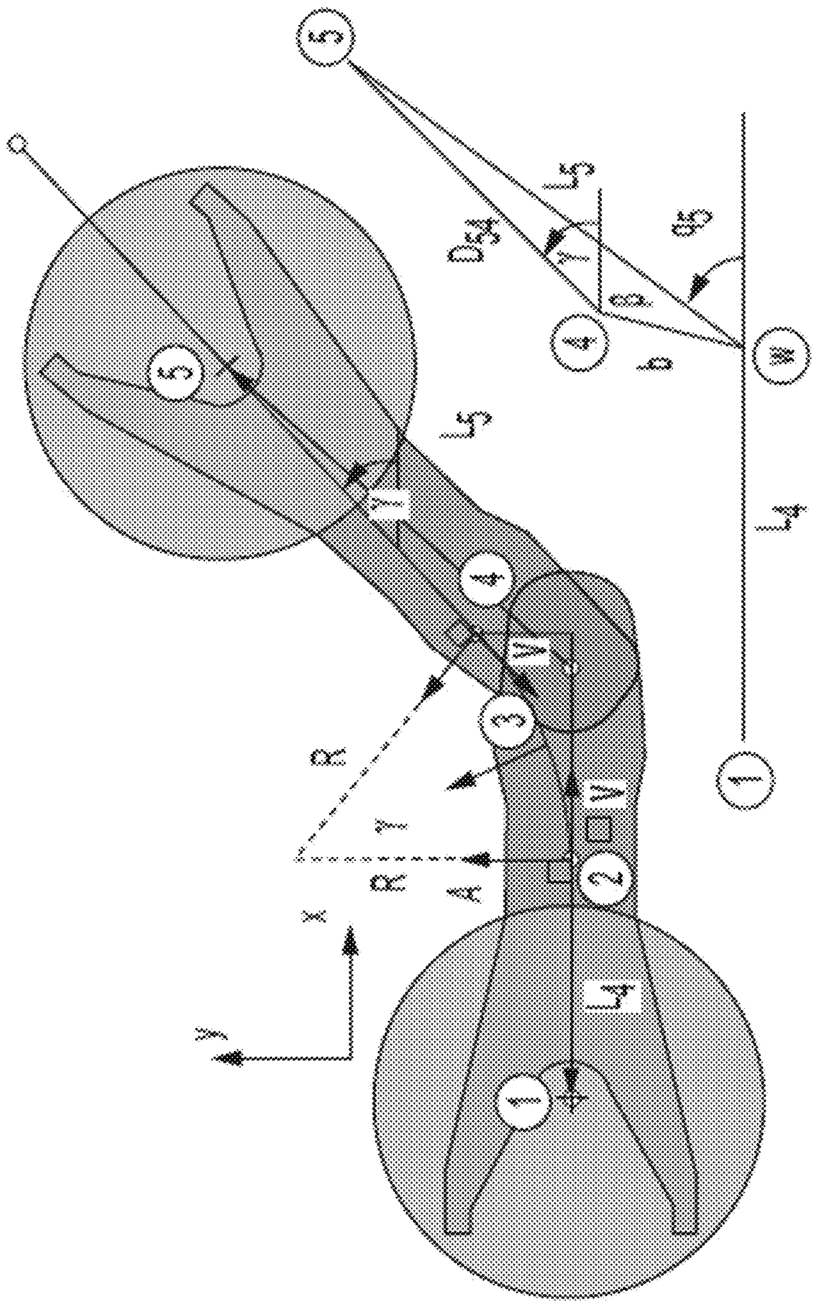
FIG. 13 depicts first and second end effectors during a portion of the wafer swapping operation for explanatory purposes according to an exemplary embodiment of the present invention.

For a given $D_{1\to2}$, R, and gamma, we can find the orientation of the inactive blade along the entry line and the distance the inactive wafer will travel along the entry line, $D_{5\to4}$ (see FIG. 13).

The position vector associated with the point ④ is found through the following, $$P_4 = D_{12} + R * i + R * \exp(i * (\pi/2\gamma)).$$

The position of the wrist at the start of the move is the following, $$P_w = L_4.$$

The value of b is the magnitude of the vector, $$b = |P_4 - P_w|.$$

The value for the angle beta is the following, $$\beta = a\tan2(imag(P_4 - P_w), \mathrm{real}((P_4 - P_w)).$$

We can then use the law of cosines to determine the following, $$L_5^2 = D_{54}^2 + b^2 - D_{54} * b * \cos(\beta + \gamma).$$

From which we can solve the quadratic equation for $D_{5\to4}$.

We then have P5, $$P5 = P4 + D45 * \exp(i * g).$$

Figure 14:
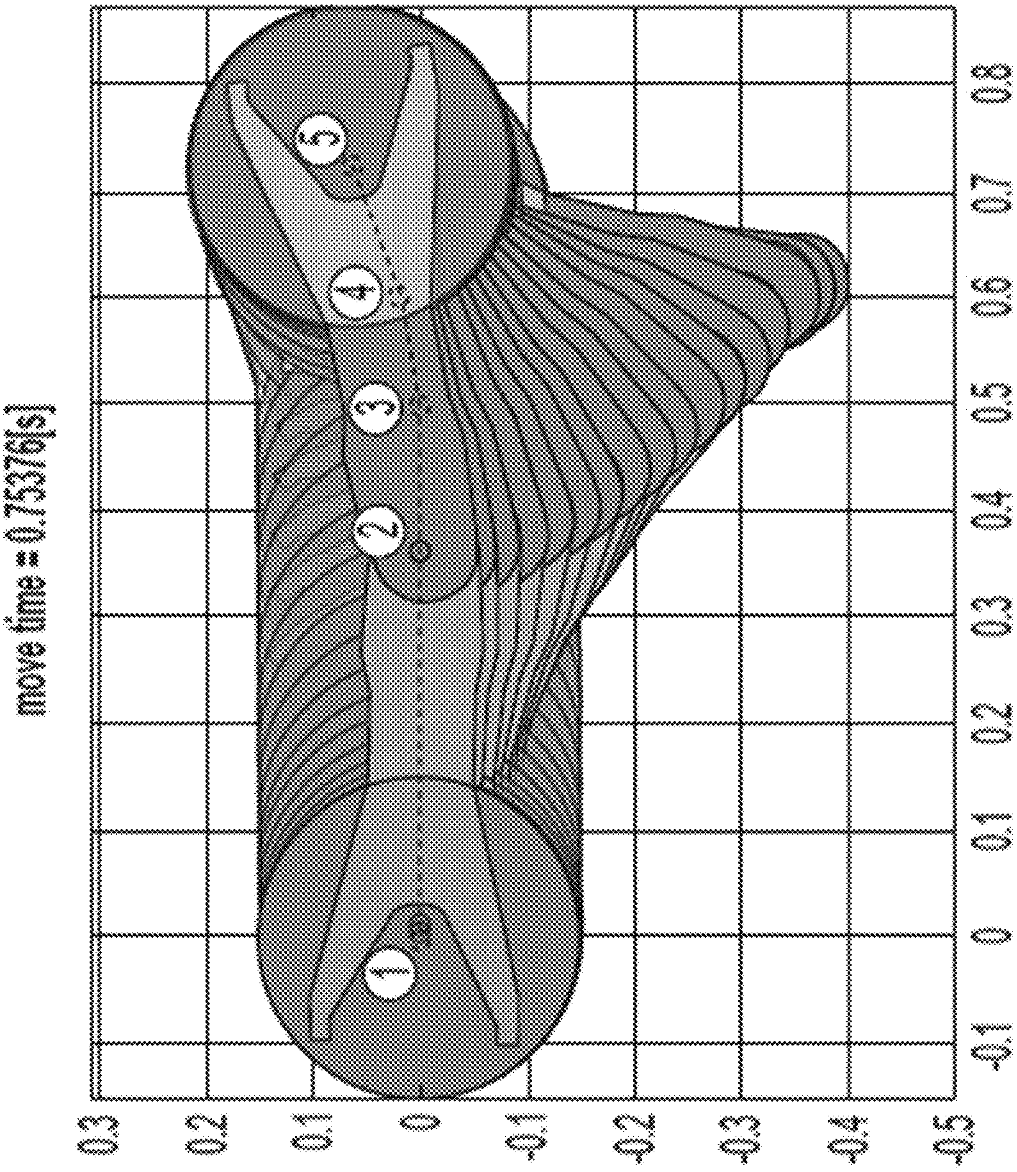
FIG. 14 depicts an example of a nonsymmetric motion profile of first and second end effectors during a wafer swapping operation with unequal length line segments for explanatory purposes according to an exemplary embodiment of the present invention.

(See FIG. 14.).

Inactive Blade Back Up (Step S112)

Another option is for the inactive blade, having a shorter line segment, to take advantage of the active blade moving towards it and to back up away from the active wafer, elongating the acceleration path, so that it can then subsequently accelerate along a longer distance to achieve a higher arc velocity.

Unequal Length, Simplified

Figure 15:
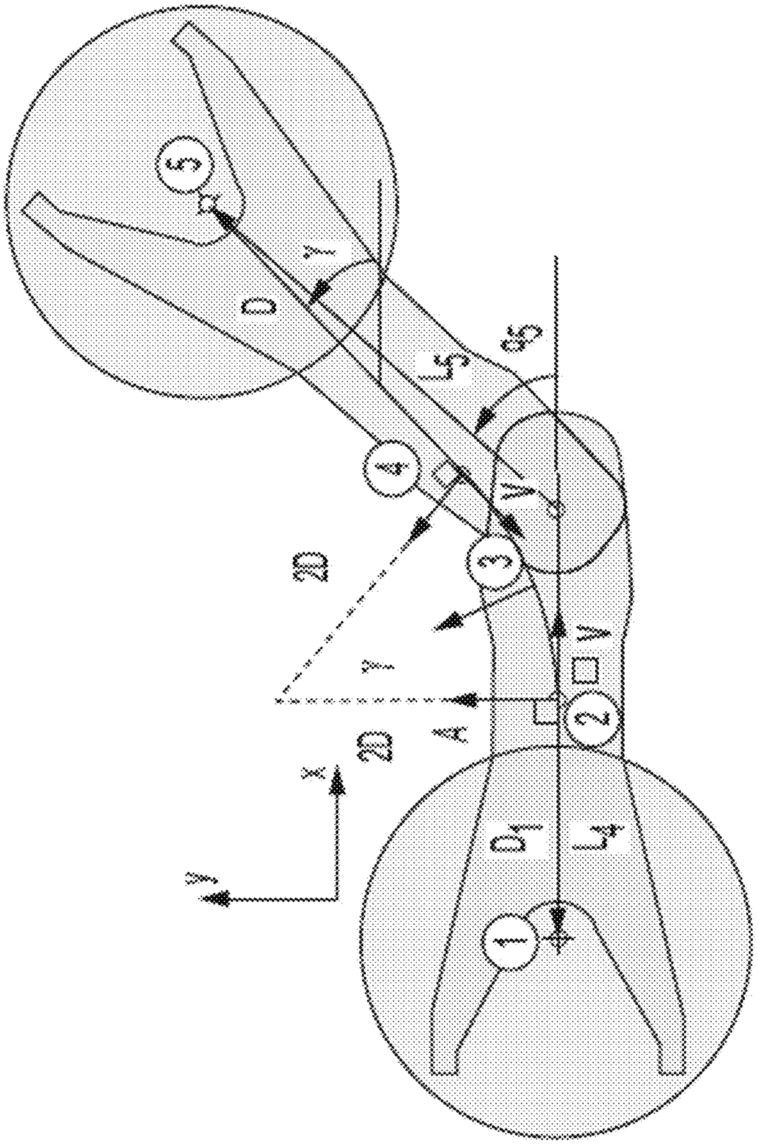
FIG. 15 depicts first and second end effectors during a portion of the wafer swapping operation for explanatory purposes according to an exemplary embodiment of the present invention.

We may wish to have the active wafer travel further from the station. The inactive wafer will travel at full acceleration along the length D. As developed above, we may know the required radius given a full linear acceleration, an equivalent centripetal acceleration, and a length D. (See FIG. 15.)

$$R = 2 * D$$

From the above, we can write the relationship in x and y.

$$x: D_1 + 2 * D * \sin(\gamma) + D * \cos(\gamma) = L_4 + L_5 * \cos(q_5)$$

$$y: 2 * D - 2 * D * \cos(\gamma) + D * \sin(\gamma) = L_5 * \sin(q_5)$$

We can isolate D on both sides of the equations, $$(D_1 - L_4) + D * (2 * \sin(\gamma) + \cos(\gamma)) = L_5 * \cos(q_5) D * (2 - 2 * \cos(\gamma) + \sin(\gamma)) = L_5 * \sin(q_5)$$

Squaring both sides and adding them together, $$(D_1 - L_4)^2 + 2 * D * (2 * \sin(\gamma) + \cos(\gamma)) * (D_1 - L_4) + D^2 * (2 * \sin(\gamma) + \cos(\gamma))^2 = L_5^2 * \cos^2(q_5)$$

$$D^2 * (2 - 2 * \cos(\gamma) + \sin(\gamma))^2 = L_5^2 * \sin^2(q_5)$$

Summing the two equations together and recognizing the identity, $$(D_1 - L_4)^2 - L_5^2 + 2 * D * (2 * \sin(\gamma) + \cos(\gamma)) * (D_1 - L_4) + D^2 * \left[(2 * \sin(\gamma) + \cos(\gamma))^2 + (2 - 2 * \cos(\gamma) + \sin(\gamma))^2\right] = 0$$

From this, we can solve this quadratic equation in D. This has effectively eliminated the variable R by making it a function of D.

D will be shorter than $D_1$.

We also know the velocity as a function of D and the allowable acceleration.

$$V_c = sqrt(2 * D * A_{c1})$$

The time in arc is simply, $$t_5 = R * \gamma / V_c$$

$$t_5 = sqrt\left(2 * D / A_c\right) * \gamma$$

Allowing for More Z Time

If you need more time to complete the z, the most important thing is to get into the safe zone as quickly as possible.

Superimposed Motion

Z Motion

Figure 16:
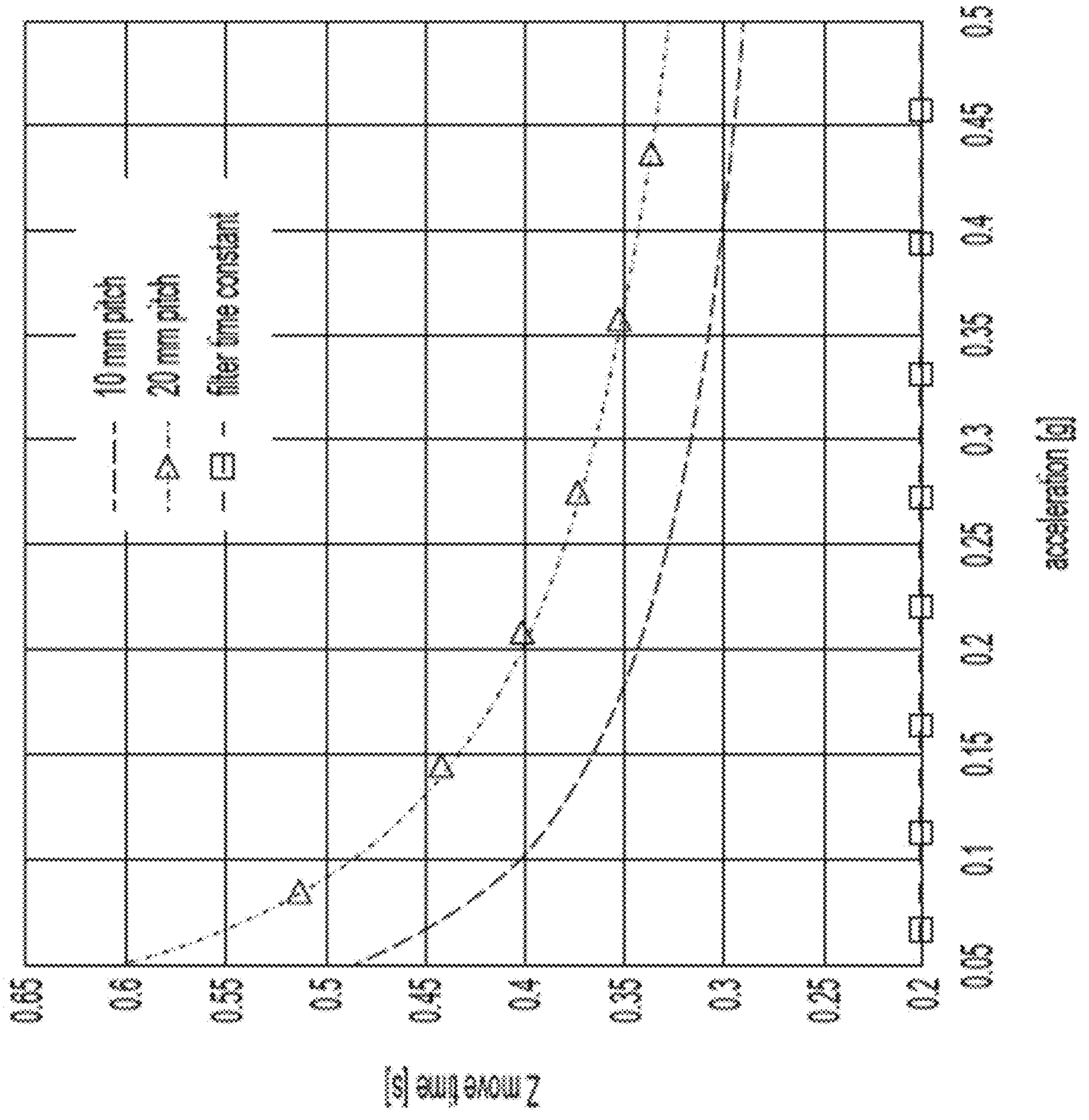
FIG. 16 is a graph of z move time as a function of acceleration for different blade pitch distances.

The entry exit point is designed to be the point where the wafer can first deviate from the straight line on an arc. At around this same location, the wafer should be allowed to move in z. So, in general, the z move must be completed while the wafers are traveling on the arc. The time required $$t_z = 2 * sqrt\left(p / A_z\right) + t_f$$

where p is the blade pitch, A is the allowable acceleration in z, and $t_f$ is the filter time constant. (See FIG. 16.)

The time the wafers will spend on the arc is the following, $$t_{arc} = R * \gamma / V$$

In order for the move to be valid, the following must be true, $$t_{arc} >= t_z$$

This requirement may compel a longer R or gamma and a smaller, V.

Figure 17:
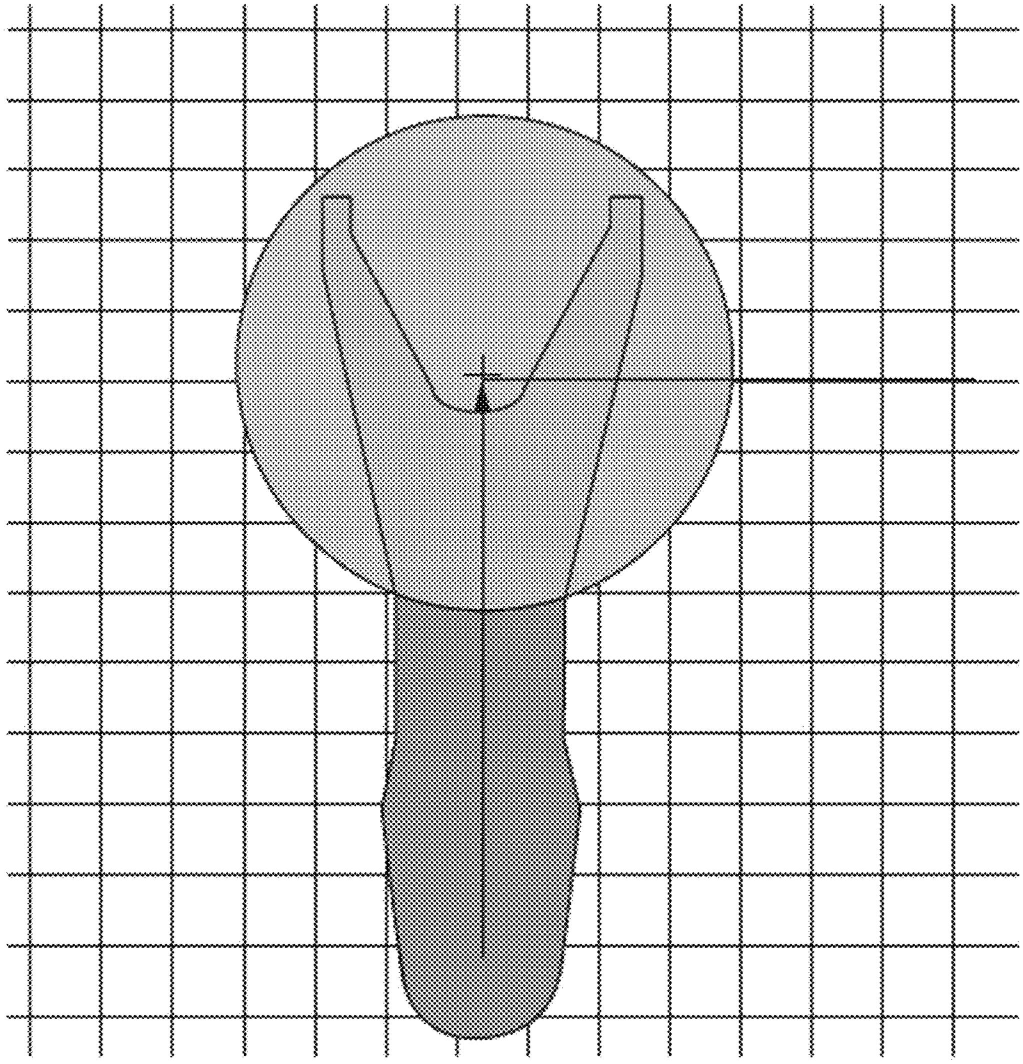
FIG. 17 depicts an end effector for purposes of a discussion of wrist acceleration according to an embodiment of the present invention.

Wrist Acceleration (See FIG. 17)

$$X_1 = L_4 * \sin(\theta)$$

$$V_{x1} = \omega * L_4 * \cos(\theta)$$

$$A_{x1} = \alpha * L_4 * \cos(\theta) - \omega^2 * L_4 * \sin(\theta)$$

$$Y_w = L_4 * (1 - \cos(\theta))$$

$$V_{yw} = \omega * L_4 * \sin(\theta)$$

$$A_{yw} = \alpha * L_4 * \sin(\theta) + \omega^2 * L_4 * \cos(\theta)$$

For theta=0 and alpha=0

$$A_{x1} = 0$$

$$A_{yw} = \alpha * L_4 * \sin(\theta) + \omega^2 * L_4$$

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention can be practiced otherwise than as specifically described herein.

What is claimed is:

1. A robotic apparatus comprising:

an arm member configured to pivot about a first axis;

a first end effector pivotably connected to the arm member about a second axis, the first end effector having a first surface upon which a first workpiece can be received;

a second end effector pivotably connected to the arm member about the second axis, the second end effector having a second surface upon which a second workpiece can be received;

at least one drive unit configured to drive the arm member to pivot about the first axis, the at least one drive unit being configured to drive the first end effector to pivot about the second axis, the at least one drive unit being configured to drive the second end effector to pivot about the second axis; and a control unit configured to control the at least one drive unit to move the arm member, the first end effector and the second end effector to perform a swapping operation that includes the first end effector and the second end effector swapping arc positions disposed at opposite ends of a same arc having a constant radius of curvature, the control unit being configured to control the at least one drive unit to move the arm member, the first end effector and the second end effector such that the first workpiece received on the first end effector and the second workpiece received on the second end effector each travel at equal and constant velocities along an entirety of the arc to prevent tangential acceleration of the first workpiece received on the first end effector and the second workpiece received on the second end effector during travel along the arc.

2. The robotic apparatus of claim 1, wherein the control unit is configured to control the at least one drive unit to move the arm member, the first end effector and the second end effector such that the equal and constant velocities produce centripetal acceleration values acting upon the first workpiece and the second workpiece along the arc that do not exceed a predetermined acceleration limit.

3. The robotic apparatus of claim 2, wherein the control unit is configured to control the at least one drive unit to move the arm member, the first end effector and the second end effector during the swapping operation without exceeding the predetermined acceleration limit to retain the first workpiece and the second workpiece on the first end effector and the second end effector, respectively, solely with surface friction without use of a suction device and without use of an edge gripping device.

4. The robotic apparatus of claim 1, wherein the first end effector and the second end effector each includes at least one of an edge-gripping device and a suction device.

5. The robotic apparatus of claim 1, wherein the swapping operation further includes at least one of:

moving the first end effector such that the first workpiece or a center of a workpiece holding position of the first end effector moves from a first start position to a first arc position of the arc positions; and moving the second end effector such that the second workpiece or a center of a workpiece holding position of the second end effector moves from a second start position to a second arc position of the arc positions.

6. The robotic apparatus of claim 5, wherein the movement of the first workpiece from the first start position to the first arc position includes straight linear movement and/or curved movement.

7. The robotic apparatus of claim 5, wherein the first start position is located within a processing chamber such that the arc extends within the processing chamber, and the second start position is located within a supply/output chamber.

8. The robotic apparatus of claim 5, wherein the movement of the first workpiece from the first start position to the first arc position includes straight linear movement of a first length, and wherein the movement of the second workpiece from the second start position to the second arc position includes straight linear movement of a second length.

9. The robotic apparatus of claim 8, wherein the control unit is configured to move the first end effector and the second end effector in symmetric motions during an entirety of the swapping operation when the first length is equal to the second length.

10. The robotic apparatus of claim 8, wherein the control unit is configured to move the first end effector and the second end effector in nonsymmetric motions during a portion of the swapping operation when the first length is unequal to the second length.

11. The robotic apparatus of claim 1, wherein the arc is convex in relation to the second axis.

12. A method of transporting workpieces with a robotic apparatus, comprising:

providing a robotic apparatus having:

an arm member configured to pivot about a first axis;

a first end effector pivotably connected to the arm member about a second axis, the first end effector having a first surface upon which a first workpiece can be received;

a second end effector pivotably connected to the arm member about the second axis, the second end effector having a second surface upon which a second workpiece can be received;

at least one drive unit configured to drive the arm member to pivot about the first axis, the at least one drive unit being configured to drive the first end effector to pivot about the second axis, the at least one drive unit being configured to drive the second end effector to pivot about the second axis; and a control unit configured to control the at least one drive unit to move the arm member, the first end effector and the second end effector; and controlling the at least one drive unit to move the arm member, the first end effector and the second end effector to perform a swapping operation that includes the first end effector and the second end effector swapping arc positions disposed at opposite ends of a same arc having a constant radius of curvature, wherein the at least one drive unit is controlled to move the arm member, the first end effector and the second end effector such that the first workpiece received on the first end effector and the second workpiece received on the second end effector each travel at equal and constant velocities along the arc.

13. The method of claim 12, wherein the at least one drive unit is controlled to move the arm member, the first end effector and the second end effector such that the equal and constant velocities produce centripetal acceleration values acting upon the first workpiece and the second workpiece along the arc that do not exceed a predetermined acceleration limit.

14. The method of claim 13, wherein the at least one drive unit is controlled to move the arm member, the first end effector and the second end effector during the swapping operation without exceeding the predetermined acceleration limit to retain the first workpiece and the second workpiece on the first end effector and the second end effector, respectively, solely with surface friction without use of a suction device and without use of an edge gripping device.

15. The method of claim 12, wherein the first end effector and the second end effector each includes at least one of an edge-gripping device and a suction device.

16. The method of claim 12, wherein the swapping operation further includes at least one of:

moving the first end effector such that the first workpiece or a center of a workpiece holding position of the first end effector moves from a first start position to a first arc position of the arc positions; and moving the second end effector such that the second workpiece or a center of a workpiece holding position of the second end effector moves from a second start position to a second arc position of the arc positions.

17. The method of claim 16, wherein the movement of the first workpiece from the first start position to the first arc position includes straight linear movement and/or curved movement.

18. The method of claim 16, wherein the first start position is located within a processing chamber such that the arc extends within the processing chamber, and the second start position is located within a supply/output chamber.

19. The method of claim 16, wherein the movement of the first workpiece from the first start position to the first arc position includes straight linear movement of a first length, and wherein the movement of the second workpiece from the second start position to the second arc position includes straight linear movement of a second length.

20. The method of claim 19, wherein the control unit is configured to move the first end effector and the second end effector in symmetric motions during an entirety of the swapping operation when the first length is equal to the second length.

21. The method of claim 19, wherein the control unit is configured to move the first end effector and the second end effector in nonsymmetric motions during a portion of the swapping operation when the first length is unequal to the second length.

22. The method of claim 12, wherein the at least one drive unit is controlled to move the arm member, the first end effector and the second end effector such that the first workpiece received on the first end effector and the second workpiece received on the second end effector each travel at the equal and constant velocities along an entirety of the arc to prevent tangential acceleration of the first workpiece received on the first end effector and the second workpiece received on the second end effector during travel along the arc.

23. The method of claim 12, wherein the arc is convex in relation to the second axis.

* * * * *